US007822651B2

(12) United States Patent
Hume et al.

(10) Patent No.: US 7,822,651 B2
(45) Date of Patent: Oct. 26, 2010

(54) METHOD FOR MANAGING RETURNS

(75) Inventors: Delma S. Hume, Peoria, IL (US); Robert L. Flint, Edelstein, IL (US); Steven L. Guse, Peoria, IL (US); Robert J. Rachowicz, Peoria, IL (US); Dennis M. Brown, Tishomingo, MS (US); Milo O. Twist, Washington, IL (US); Theresa D. Wire, Pekin, IL (US)

(73) Assignee: Caterpillar Inc, Peoria, IL (US)

( * ) Notice: Subject to any disclaimer, the term of this patent is extended or adjusted under 35 U.S.C. 154(b) by 2130 days.

(21) Appl. No.: 10/612,659

(22) Filed: Jul. 2, 2003

(65) Prior Publication Data

US 2004/0039658 A1    Feb. 26, 2004

Related U.S. Application Data

(60) Provisional application No. 60/395,748, filed on Jul. 12, 2002.

(51) Int. Cl.
   *G06F 17/60* (2006.01)
(52) U.S. Cl. ........................................ 705/28; 235/375
(58) Field of Classification Search .................. 705/28; 235/375
   See application file for complete search history.

(56) References Cited

U.S. PATENT DOCUMENTS

| 5,974,395 | A | 10/1999 | Bellini et al. |
| 6,269,344 | B1 | 7/2001 | Junger |
| 6,341,271 | B1 | 1/2002 | Salvo et al. |
| 6,463,421 | B2 * | 10/2002 | Junger .......................... 705/28 |
| 6,536,659 | B1 * | 3/2003 | Hauser et al. ................ 235/375 |
| 6,543,683 | B2 | 4/2003 | Hoffman |

* cited by examiner

*Primary Examiner*—Vanel Frenel
(74) *Attorney, Agent, or Firm*—William B. Heming

(57) ABSTRACT

There are many situations where returns are needed to further business or other objectives. For example, in remanufacturing businesses, cores are rebuilt into remanufactured parts that are sold. To sustain remanufacturing, cores must be obtained. One way to assure a supply is to collect a deposit against a core return when a remanufactured part is sold. Tracking of cores and the associated liabilities for the deposits is complex. It is also beneficial to control the liabilities. Provided are systems, methods and steps that enable tracking and other effective management techniques to assure returns and liabilities are managed. In one embodiment, each core and an associated entitlement representative of a liability are tracked. Price changes can be made on core deposits without affecting the ability to control liabilities. The systems, processes and methods lend themselves to computer implementation and use in large businesses.

13 Claims, 12 Drawing Sheets

ENTITLEMENT AUDIT

| | | | | |
|---|---|---|---|---|
| Customer Code: | 310 | Customer Name: | XYZ Company | |
| CAF Code: | HA07 | CAF Description: | | |
| Transaction Type: | ALL | Serial Number: | | |
| Currency Code: | USD | Sorted by: | | |
| Date from: | 1/1/2002 | Date to: | 1/15/2002 | |

PERIOD SUMMARY

| Period Beg. Balance | Purchase Invoices | In Process | Credits | Insp. Var. | Claims/Neg. | Attritions | Surplus Returns | Policy Adjs | Period End Balance |
|---|---|---|---|---|---|---|---|---|---|
| $106,590.00 | $22,440.00 | 0 | $8,837.92 | -$2,382.08 | $0.00 | $0.00 | $0.00 | $0.00 | $135,485.94 |
| 57 | 12 | 0 | -6 | | 0 | 0 | 0 | | 63 |

CUSTOMER ACTIVITY AUDIT TRAIL

| | 178 Customer | 180 Part No. | 182 CAF | 184 Type | 186 Amount | 188 Qty | 190 Bal | 192 Trans Date | 194 Attrition Date | 196 Doc No. |
|---|---|---|---|---|---|---|---|---|---|---|
| 168-1 | 314 | R367 | HA06 | INV | $1,870.00 | 1 | 58 | 1/2/2002 | 4/3/2003 | M000492 |
| 168-2 | 314 | R367 | HA06 | INV | $3,740.00 | 2 | 60 | 1/3/2002 | 4/4/2003 | M001367 |
| 168-3 | 310 | R367 | HA06 | CCR | -$1,097.97 | -1 | 59 | 1/7/2002 | | D310-002 |
| 168-4 | 310 | R367 | HA06 | CCR | -$1,870.00 | -1 | 58 | 1/7/2002 | | D310-005 |
| 168-5 | 316 | R367 | HA06 | INV | $1,870.00 | 1 | 59 | 1/7/2002 | 4/8/2003 | M002981 |
| 168-6 | 310 | R367 | HA06 | INV | $1,870.00 | 1 | 60 | 1/7/2002 | 4/8/2003 | M003281 |
| 168-7 | 310 | R367 | HA06 | CCR | -$1,097.97 | -1 | 59 | 1/8/2002 | | D310-007 |
| 168-8 | 310 | R488 | HA06 | INV | $1,870.00 | 1 | 60 | 1/8/2002 | 4/9/2003 | M004192 |
| 168-8 | 312 | R367 | HA06 | INV | $3,740.00 | 2 | 62 | 1/8/2002 | 4/9/2003 | M004193 |
| 168-10 | 310 | R367 | HA06 | INV | $1,870.00 | 1 | 63 | 1/9/2002 | 4/10/2003 | M005102 |
| 168-11 | 316 | R367 | HA06 | INV | $1,870.00 | 1 | 64 | 1/10/2002 | 4/11/2003 | M005671 |
| 168-12 | 312 | R367 | HA06 | CCR | -$1,031.98 | -1 | 63 | 1/11/2002 | | D312-024 |
| 168-13 | 312 | R367 | HA06 | CCR | -$1,870.00 | -1 | 62 | 1/11/2002 | | D312-025 |
| 168-14 | 312 | R367 | HA06 | CCR | -$1,870.00 | -1 | 61 | 1/11/2002 | | D312-027 |
| 168-15 | 310 | R367 | HA06 | INV | $1,870.00 | 1 | 62 | 1/14/2002 | 4/15/2003 | M008018 |
| 168-16 | 314 | R488 | HA06 | INV | $1,870.00 | 1 | 63 | 1/15/2002 | 4/16/2003 | M009032 |

FIG 4

ENTITLEMENT AUDIT

Customer Code:     310              Customer Name:      XYZ Company
CAF Code:          HA06             CAF Description:
Transaction Type:  ALL              Serial Number:
Currency Code:     USD
Date from:         1/1/2002         Date to:            1/15/2002
                                    Sorted by:

Selected Audit Trail

| | Customer | Part No. | CAF | Type | Amount | Qty | Trans Date | Attrition Date | Customer Sales Doc | Doc No. |
|---|---|---|---|---|---|---|---|---|---|---|
| 1-2/2 | 310 | R367 | HDA061 | CCR | -$1,870.00 | -1 | 1/7/2002 | | | D310-00W0 |

↙ 206

Details for Selected Audit Trail

| | Customer | Part No. | CAF | Type | Amount | Qty | Trans Date | Attrition Date | Customer Sales Doc | Doc No. |
|---|---|---|---|---|---|---|---|---|---|---|
| 208 → | 310 | R367 | HA06 | INV | $1,870.00 | 1 | 9/28/2001 | 12/28/2002 | | M40867 |
| 168-3 → | 310 | R367 | HA06 | CCR | -$1,870.00 | -1 | 1/7/2002 | | | D310-00 |

FIG 5

| | Activity Number 220 | Activity 222 | Dealer Books Dollar Amount 224 | Company Books Liability Account 226 | Company Books Income Account 227 |
|---|---|---|---|---|---|
| Fig. 6A | 228A | Entitlement | $1,870.00 | -$1,870.00 | |
| | 229A | Core returned | -$1,870.00 | $1,870.00 | $0.00 |
| | 230A | | $0.00 | $0.00 | |
| Fig. 6B | 228B | Entitlement | $1,870.00 | -$1,870.00 | |
| | 229B | Core returned | -$500.00 | $1,870.00 | -$1,370.00 |
| | 230B | | $1,370.00 | $0.00 | -$1,370.00 |
| Fig. 6C | 228C | Entitlement | $1,870.00 | -$1,870.00 | |
| | 229C | Core returned | $0.00 | $1,870.00 | -$1,870.00 |
| | 230C | | $1,870.00 | $0.00 | -$1,870.00 |

FIG 6

ENTITLEMENT AUDIT

| | | Customer Name: | XYZ Company |
|---|---|---|---|
| Customer Code: | D310 | CAF Description: | |
| CAF Code: | RA07 | Serial Number: | |
| Transaction Type: | ALL | | |
| Currency Code: | USD | | |
| Date from: | 1/1/2000 | Date to: | 7/31/2001 |

Period Summary 753

| Period Beg. Balance | Purchase Invoices | In Process | Credits | Insp. Var. | Claims/Neg. | Attri-tions | Surplus Returns | Policy Adjs | Period End Balance |
|---|---|---|---|---|---|---|---|---|---|
| 1 | 3 | 0 | -3 | | 0 | -4 | 0 | 0 | 1 |
| $3,540.00 | $2,124.00 | | -$2,124.00 | $0.00 | $0.00 | -$2,832.00 | $0.00 | $0.00 | $708.00 |

Customer Activity Audit Trail 706

1 - 10 / 10

| | 778 Customer | 780 Part No. | 782 CAF | 784 Type | 786 Amount | 788 Qty | 790 Bal | 792 Trans Date | 794 Attrition Date | 796 Doc No. |
|---|---|---|---|---|---|---|---|---|---|---|
| 768-1 | 310 | R134 | RA073 | INV | $708.00 | 1 | 6 | 1/25/2000 | 7/23/2001 | M147305 |
| 768-2 | 310 | R134 | RA073 | INV | $708.00 | 1 | 7 | 1/25/2000 | 7/23/2001 | M147306 |
| 768-3 | 310 | R134 | RA073 | CCR | -$708.00 | -1 | 6 | 1/28/2000 | | D310-151791 |
| 768-4 | 310 | R134 | RA073 | CCR | -$708.00 | -1 | 5 | 1/28/2000 | | D310-151792 |
| 768-5 | 310 | R134 | RA073 | INV | $708.00 | 1 | 6 | 10/16/2000 | 4/14/2002 | M820001 |
| 768-6 | 310 | R134 | RA073 | CCR | -$708.00 | -1 | 5 | 3/14/2001 | | D312-101861 |
| 768-7 | 310 | R134 | RA073 | ATT | -$708.00 | -1 | 4 | 7/16/2001 | | M998581 |
| 768-8 | 310 | R134 | RA073 | ATT | -$708.00 | -1 | 3 | 7/16/2001 | | M16997 |
| 768-9 | 310 | R134 | RA073 | ATT | -$708.00 | -1 | 2 | 7/23/2001 | | M147305 |
| 768-10 | 310 | R134 | RA073 | ATT | -$708.00 | -1 | 1 | 7/23/2001 | | M147306 |

FIG 7

ENTITLEMENT AUDIT

| Customer Code: | 310 | | Customer Name: | XYZ Company |
| --- | --- | --- | --- | --- |
| CAF Code: | RA07 | | CAF Description: | |
| Transaction Type: | ALL | | Serial Number: | |
| Currency Code: | USD | | | |
| Date from: | 1/1/2000 | | Date to: | 7/31/2001 |

Selected Audit Trail

| | Customer | Part No. | CAF | Type | Amount | Qty | Trans Date | Attrition Date | Customer Sales Doc | Doc No. |
| --- | --- | --- | --- | --- | --- | --- | --- | --- | --- | --- |
| 1 - 2 / 2 | 310 | OR1349 | RA07 | ATT | -$708.00 | -1 | 7/23/2001 | 7/23/2001 | | M147305 |

Details for Selected Audit Trail Row

| | Customer | Part No. | CAF | Type | Amount | Qty | Trans Date | Attrition Date | Customer Sales Doc | Doc No. |
| --- | --- | --- | --- | --- | --- | --- | --- | --- | --- | --- |
| 768-1 | 310 | OR1349 | RA07 | INV | $708.00 | 1 | 1/25/2000 | 7/23/2001 | | M147305 |
| 768-9 | 310 | OR1349 | RA07 | ATT | -$708.00 | -1 | 7/23/2001 | 7/23/2001 | | M147305 |

FIG 8

ENTITLEMENT AUDIT

Customer Code: 310  
CAF Code: HA07  
Transaction Type: ALL  
Currency Code: USD  
Date from: 1/1/2002

Customer Name: XYZ Company  
CAF Description:  
Serial Number:  
Sorted by:  
Date to: 1/15/2002

CUSTOMER ACTIVITY AUDIT TRAIL

| | Part No. | CAF | Type | Amount 986a Inspection | 986b Attrition | Qty | Bal | 992 Trans Dte | Attrition Date 994a Time | 994b Value | Doc. No. |
|---|---|---|---|---|---|---|---|---|---|---|---|
| 168-1 | R367 | HA06 | INV | $1,870.00 | | 1 | 58 | 1/2/2002 | 11/3/2002 | 4/3/2003 | M000492 |
| 168-2 | R367 | HA06 | INV | $3,740.00 | | 2 | 60 | 1/3/2002 | 11/4/2002 | 4/4/2003 | M001367 |
| 168-3 | R367 | HA06 | CCR | -$1,097.97 | -$878.38 | -1 | 59 | 1/7/2002 | | | D310-002 |
| 168-4 | R367 | HA06 | CCR | -$1,870.00 | | -1 | 58 | 1/7/2002 | | | D310-005 |
| 168-5 | R367 | HA06 | INV | $1,870.00 | | 1 | 59 | 1/7/2002 | 11/8/2002 | 4/8/2003 | M002981 |
| 168-6 | R367 | HA06 | INV | $1,870.00 | | 1 | 60 | 1/7/2002 | 11/8/2002 | 4/8/2003 | M003281 |
| 168-7 | R367 | HA06 | CCR | -$1,870.00 | -$1,097.97 | -1 | 59 | 1/8/2002 | | | D310-007 |
| 168-8 | R488 | HA06 | INV | $1,870.00 | | 1 | 60 | 1/8/2002 | 11/9/2002 | 4/9/2003 | M004192 |
| 168-9 | R367 | HA06 | INV | $3,740.00 | | 2 | 62 | 1/8/2002 | 11/9/2002 | 4/9/2003 | M004193 |

FIG 9

METHOD FOR MANAGING RETURNS

This application claims the benefit of prior provisional patent application Serial No. 60/395,748 filed Jul. 12, 2002.

TECHNICAL FIELD

The invention relates to systems, methods and steps for managing the return of items against sales, and more particularly to managing returns to receive back deposits made when items are sold.

BACKGROUND

There are many situations that depend upon the return of items. For example, in a remanufacturing business, worn products, components or parts are rebuilt or remanufactured to be resold. Depending upon the remanufacturing process, such items may be as good as, or nearly as good as, new and carry similar warranties. Yet these items can typically be sold at lower prices than a new item, which makes them economically attractive to customers.

These worn items are sometimes called cores in a remanufacturing business, especially in the automotive or industrial sectors. A core, for example, may be as large as an engine. Cores may also be smaller components or parts such as pumps or crankshafts. In order for a remanufacturing business to be able to remanufacture cores for resale, it must obtain the cores. And it is important to assure the supply is consistent and of sufficient quality to schedule the remanufacturing process and assure customer needs are met.

Typically, the remanufacturing business will purchase cores, but there are varying ways to assure the supply of the cores to be purchased. Most commonly, when a remanufactured item is sold, a core deposit is required. A core deposit represents value paid by the purchaser of the item against the return of the core. The purchaser will then have an economic incentive to return a core.

The acceptance of core deposits creates a liability to the remanufacturing business. That is, the remanufacturing business will owe the purchaser the amount of the core deposit for return of a core. In large remanufacturing businesses, the acceptance of core deposits and returned cores can be complicated because of the volumes involved and the use of intermediate parties such as distributors or dealers. It is also important to manage the liabilities, so that the remanufacturing business understands, among other things, its financial position, whether returns of core deposits are being properly made, and the availability of cores for remanufacturing.

Many methods are used by remanufacturers to account for the receipt of cores, their inspection and subsequent return of the core deposit. However, problems may arise. Cores are not always returned immediately or at all. The liabilities for core deposits thus may remain for lengthy periods without resolution. It will be further appreciated that tracking cores from multiple sources through a distributor or dealer to the remanufacturer, and managing attendant liabilities, is complex. Additionally, remanufacturers have a need from time to time to encourage and accept cores that are in addition to those related to the sale of items. Remanufacturers will do this to increase production of remanufactured parts or supplement normal core returns where, for example, purchasers are not returning cores in sufficient quantity or of sufficient value.

There have been various approaches to addressing issues such as discussed above. For example, liabilities beyond a certain age have been cancelled based upon intervention at discrete intervals to determine whether core deposits have been held beyond certain times. The typical approach has been to cancel core deposit liabilities in blocks, meaning all core deposits in their entirety prior to a certain date may be cancelled. This is done without considering the individual age of each core deposit. Core deposit liabilities have been cancelled beginning with the earliest ones first. This has been done to reduce the outstanding ages of the liabilities, but complex systems that manage such a level of detail have not been successfully applied.

Another approach has been to cancel core deposits on a rolling forward basis. In other words, a query is made for a time period (such as a particular month) to see what core returns were made in that month. These core returns are then used to offset the appropriate number of core deposits from the group of core deposits not already paid back and shown as available in that month.

From time to time, it is beneficial to raise the core deposit amounts purchasers must pay. This may be done to encourage more core returns or to reflect the market for remanufactured parts. Price increases on core deposits can cause considerable confusion where individual transactions are not controlled and liabilities remain outstanding for lengthy periods. This is partly because cores associated with different value deposits are returned at random and by different participants in the process. It is desirable a core at one price should offset the liability of a core deposit at the same price.

No effective way has made itself apparent to change the core deposit amounts required from time to time without affecting all liabilities in the system. That is, without the ability to manage at the core deposit and core return level, all existing liabilities would also need to be raised at the time of price increases. This would expose the remanufacturer to additional liability for which it had not received deposits. This not only disadvantages the remanufacturer on core returns, but also on the return of unsold, remanufactured items. It will be appreciated, therefore, that businesses relying on the return of items require approaches to carefully manage the returns, particularly vis-à-vis liabilities created by deposits to be refunded at the time of those returns.

The present invention is directed to overcoming one or more of the problems set forth above.

SUMMARY OF THE INVENTION

In one aspect of the present invention, a method is provided for accepting returns. The method includes steps of establishing prices for items that have a portion attributable to a deposit price, selling the items and creating an entitlement for each sale. Further steps include accepting returns, matching each return with a specific entitlement, terminating the matched entitlement and providing a credit based upon the value of the return. Other steps include adjusting prices of items, creating entitlements reflecting the changed prices and continuing to accept returns. Another step includes terminating an entitlement as a return is made based upon the earliest date of the available entitlements without regard to deposit price.

In another aspect of the present invention, a method is provided for accepting multiple returns over time against the sale of multiple items over time. Steps include establishing the price of the items and the amount of credit available for returns, selling the items and creating an entitlement for each item sold. Other steps include accepting returns for credit, matching each return with an available entitlement with respect to type of item associated with the return and the relationship of time identifiers of the entitlement and return, and terminating the matched entitlements. Yet other steps include providing an adjustment to the liability based upon value of the return, changing the amount of credit available based upon the adjustments and continuing to terminate matched entitlements based upon relationships of the entitlement and return.

In yet another aspect of the present invention, a method of managing a business includes steps of selling items and recording a liability associated a first return price component of the sale of the item. Further steps include giving credits against liabilities for returns, modifying the return price component and giving a credit for a subsequent return at the first price component.

In still another aspect of the present invention, a method of accepting back unsold items in a business that accepts returns for credit includes a step of selling items having a first selling price having a first item price component and a first deposit price component. Additional steps include recording a liability associated with the first deposit price and giving credits against liabilities for returns. Other steps include modifying the first item price component to a second item price component for some of the items, and accepting back an item sold at the first selling price. Another step includes giving a credit for the item at the second item price component and the first deposit price component.

In still one more aspect of the present invention, a remanufacturing business method includes steps of selling remanufactured items to dealers, collecting a core deposit on each sale, creating an entitlement and reselling the items to customers. Further steps include collecting a core deposit from a customer and collecting from customers at random cores being returned. An additional step includes returning cores collected from customers by dealers to the remanufacturer. Additional steps include collecting a different core deposit for some items sold and selecting an entitlement for a core returned. Yet another step includes terminating the selected entitlement.

In yet one more aspect of the present invention, a method is provided for accepting returns for credit. The method includes steps of selling an item, receiving a deposit and establishing a liability for the deposit. Other steps include setting a time parameter and value parameter. Additional steps include receiving a return and applying the full amount of a potential credit against the liability if a date associated with the return is within the time parameter. Another step includes applying less than the full amount of the potential credit if the date is within the value parameter.

In yet another aspect of the present invention, a method is provided for remanufacturing cores into remanufactured items. The method includes steps of having a plurality of liabilities associated with different deposits paid, receiving a core, and determining the amount of credit available for returning the core. Other steps include selecting the oldest available liability against which to apply the credit, applying the liability to purchase the core, purchasing the core and remanufacturing the core.

In still one more aspect of the present invention, a method is provided for accepting the return of a portion of an item. Steps include selling items, collecting deposits, creating entitlements and receiving an unspent portion for credit. Other steps include receiving a core credit request for the unspent portion, identifying an entitlement, and locking the entitlement. Additional steps include processing the unspent portion, determining the acceptability of the core credit request and terminating the entitlement.

In another aspect of the present invention, a method is provided for accepting returns from multiple dealers, the returns being obtained from multiple sources. Steps include selling items over time by the manufacturer to the dealers, collecting different deposit amounts by the manufacturer from the dealers, recording at the manufacturer level an entitlement for each deposit, and designating each entitlement with identifiers. Further steps include selling items by dealers to others, collecting by the dealers different deposit amounts on like items, and receiving returns at the manufacturer. Additional steps include reviewing entitlements of the returning dealer, selecting entitlements having identifiers and identifying an entitlement from the selected entitlements. Other steps include terminating the identified entitlement and providing credit to the dealer.

BRIEF DESCRIPTION OF THE DRAWINGS

FIG. 4 illustrates an exemplary presentation of data consistent with the principles related to the present invention and, in part, depicting information with respect to the exemplary embodiment of FIG. 3;

FIG. 5 illustrates another exemplary presentation of data consistent with the principles related to the present invention and depicting information with respect to the exemplary embodiment of FIG. 3;

FIG. 6 illustrates an example of accounting associated with the embodiment of FIG. 3 and consistent with the principles related to the present invention;

FIG. 7 illustrates an exemplary presentation of data with respect to another embodiment of, and consistent with the principles related to, the present invention;

FIG. 8 illustrates another exemplary presentation of data with respect to the embodiment of FIG. 7 and consistent with the principles related the present invention;

FIG. 9 illustrates another exemplary presentation of data with respect to yet another embodiment of, and consistent with the principles related to, the present invention;

DETAILED DESCRIPTION

Reference will now be made in detail to the exemplary aspects of the invention, which are illustrated in the accompanying drawings.

Figure 1:
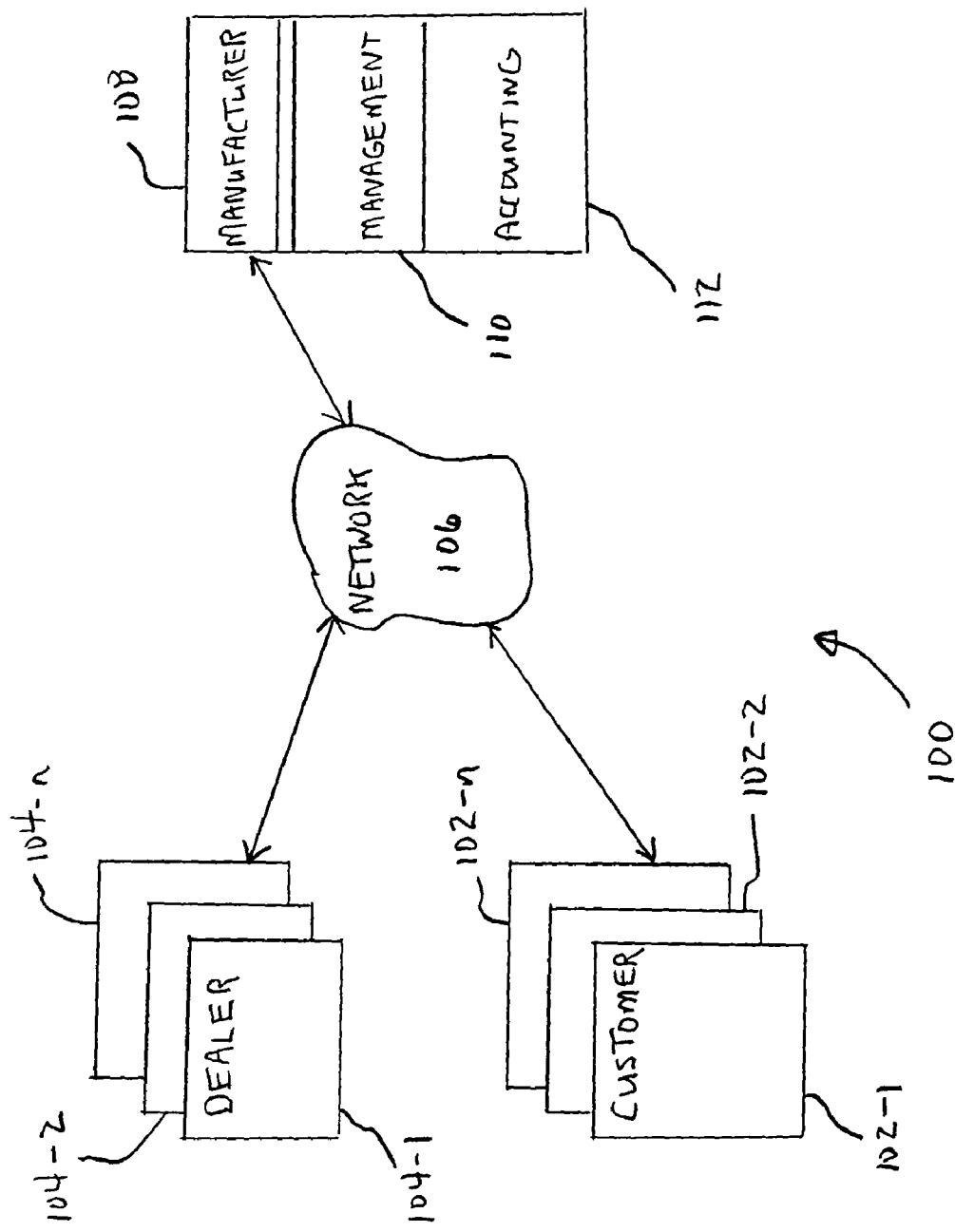
FIG. 1 illustrates an exemplary system in which systems, methods and steps consistent with the principles related to the present invention may be implemented.

FIG. 1 illustrates an exemplary system 100, in which features and principles consistent with the systems, methods and steps of the present invention may be implemented. As shown, the exemplary system 100 is computer implemented. It does not need to be so implemented or practiced, the present invention being capable of applications without such tools. The system environment may include a plurality of customer systems 102-1 to 102-n (also sometimes referred to as customer system or systems 102 for convenience), a plurality of dealer systems 104-1 to 104-*n* (also sometimes referred to as dealer system or systems 104 for convenience), and a network 106. The system 100 further includes a provider or manufacturer system 108, which in this example illustrates a management system 110 and an accounting system 112. One skilled in the art will realize that any number of these elements may be implemented, or may be combined, within the environment without departing from the scope of the present invention. It should also be understood that the broad concept of system as described is not the necessary environment for practicing principles of the invention. The invention may be practiced between individual parties or in other environments.

Each customer 102 or dealer 104 system may be a desktop computer, workstation, laptop, personal digital assistant, and any other computer system known in the art. For example, a representative system 102 or 104 may include a processor, associated memory, and numerous other elements and functions available in computer systems. These elements may include input/output devices, such as a keyboard, mouse and display, although these input means may take other forms. Also, included in such systems 102 or 104 may be a network interface and a web browser application stored within a local memory for communicating with network 106. Customer or dealer systems 102 or 104 may also be associated with handheld and/or portable computing devices. Customers and dealers as further discussed below may operate their respective systems 102, 104 to perform functions consistent with features related to the present invention.

Network 106 interconnects customer 102 and dealer 104 systems, as well as other systems such as the provider or manufacturer system 108. The roles of the customers, dealers and provider or manufacturer will be explained later. The exemplary system utilizes these roles for illustration, but others may play similar or different roles in consistent with the present invention. Network 106 may include one or more communication networks and servers, including the internet or another network that may support web-based processing. The manufacturer system 108, as well as systems 110, 112, may be a computer system (or part of one system) that provides information to a requesting entity through network 106. The systems 108, 110, 112 may include a desktop computer, workstation, mainframe, or any other server system known in the art and may include and/or be connected to one or more memory devices, such as databases.

The systems, methods and steps to be discussed, as illustrated by the examples and embodiments, facilitate the return of items and the management of liabilities or other commitments associated with the items. In the particular embodiments discussed, the systems, methods and steps will be described for illustration with respect to liabilities created by deposits paid to encourage returns. In particular, reference will be made to a remanufacturing oriented business that involves selling items, collecting deposits, receiving cores back that are associated with those items, and providing an accounting for the transactions. The elements of this business are more fully described in FIG. 2. The present invention is, however, not limited to a remanufacturing oriented business. Other businesses involving items that are sold or otherwise disposed of and for which a return is desired, may also apply principles of the systems, methods and steps discussed.

Figure 2:
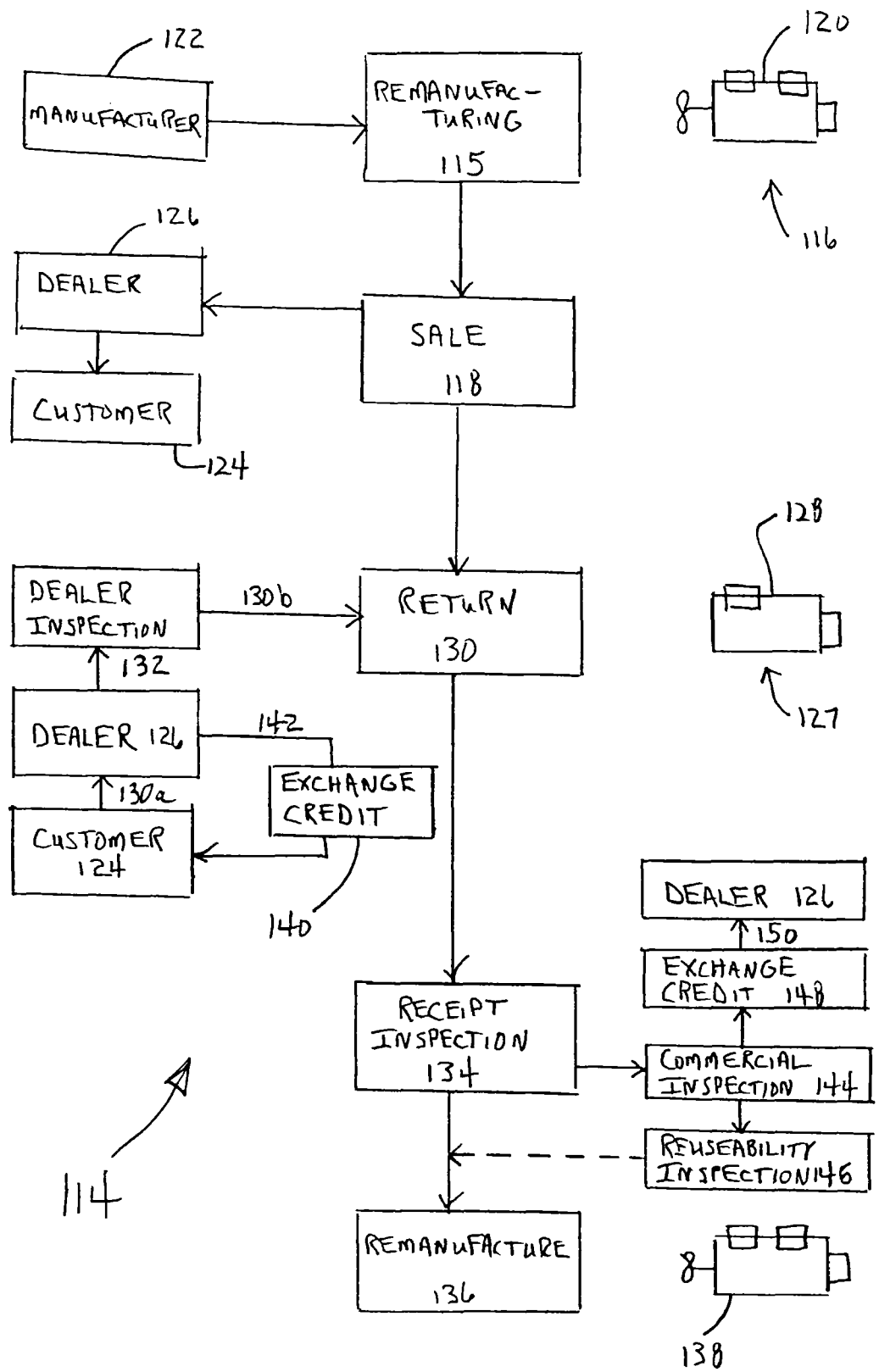
FIG. 2 illustrates a flow chart of an exchange model for remanufacturing in which systems, methods and steps consistent with the principles of the present invention may be implemented.

Referring to FIG. 2, an exchange model 114 is illustrated for purposes of a general understanding of how a remanufacturing oriented business works. Resulting from a remanufacturing step 115, an item or product 116 is illustrated that will be sold at a step 118. In this example, the product 116 is an engine 120 manufactured or remanufactured by manufacturer 122 that operates manufacturer system 108. The engine 120 will be sold to a customer 124 by a dealer or distributor 126 that operates one of the dealer systems (such as dealer system 104-1) and purchases the engine 120 from manufacturer 122. In other embodiments, manufacturer 122 may sell directly to customers or to both.

Reference to dealers and distributors 126 above and in the other illustrated embodiments is meant to indicate a party that acts between another party such as manufacturer 122 and end customers 124. Depending upon the business, this may include a wholesaler or retailer. There may also be several levels of distribution to the end customers. The systems, methods and steps will accommodate any of these business arrangements. Further reference will simply be to dealers 126 for simplicity, with the assumption that only one level of distribution exists between manufacturer 122 and customers 124. It should also be understood that the systems, methods and steps will be applicable without any intervening party.

In many businesses, customers 124 do not necessarily communicate electronically with dealers 126. Customers 124 often walk in to the dealer 126 and purchase items 116 across the counter, either with cash or credit. Mail order is also common. Because of this, dealers often will have their own systems, methods or steps to act with respect to returns 127 received from customers 124. Therefore, customers 124 may operate one of the customer systems 102 shown in FIG. 1 to communicate with a dealer, but are just as likely not to do so.

In cases where manufacturer 122 sells directly to customers 124, a dealer 126 may not be a part of the system or any steps or methods. However, manufacturer 122 may sell to both. Typically, where dealers are involved, customers 124 would not communicate directly with manufacturer 122. It may be the case, though, that larger customers 124 may deal directly with manufacturer 122.

When the item or product 116 (such as the remanufactured product) is sold at step 118, a core deposit is paid in addition to the cost of the remanufactured product. The customer 124 has the opportunity to receive the core deposit back when a core is returned. The condition of the core 128 will determine the exact amount back against the deposit that customer 124 will receive. Transactions such as these are typically in currency, such as U.S. dollars, but can also be done in script or trade credits.

The price of an item 116, such as a remanufactured part 120 sold by the manufacturer 122 to dealer 126, and by the dealer 126 to a customer 124, can be looked upon as comprised of the following:

> Item Price=Item Price Component+Return Price Component

The item price component is simply the sales price of the item 116. The return price component is the amount attributed to the economic value of the return 128. The economic value of the return is dependent upon a number of variables, including the intrinsic value of the return and the incentive the manufacturer 122 desires to build into the pricing to encourage returns. The return price component is often represented by the deposit paid at the time of a purchase, but it does not need to be. The return price component may also be a liability or other record that reflects cost, value or accountability associated with a return by a party.

In the example for the remanufacturing business, the following version of the formula is relevant:

> Remanufactured Part Price=Part Price Component+ Core Price Component

In remanufacturing, the remanufactured part price is often set at the equivalent of the new part price. This means that the core price component may be set at a relatively high value even though the core may have a lower intrinsic value. This does have the effect of encouraging the return of cores. A high return of cores assures a ready supply for the remanufacturing business.

With the sale of the engine 120, then, the model 114 contemplates a return 127, in this case a core 128. The core 128 associated with the engine 120 will be returned at a step 130. The core 128 is shown schematically less complete than the engine 120 to illustrate that it has wear and/or fewer parts. It will be appreciated, therefore, that there are three primary participants in the exemplary exchange model. The manufacturer 122 sells the product to dealer 126. The dealer 126 interfaces directly with customers 124 by selling the remanufactured parts and collecting their cores for ultimate return to manufacturer 122 for remanufacturing.

In the context of a remanufacturing business, a core is a reusable, worn or unspent portion of an item or product. The core is what can be rebuilt into a "remanufactured" product that can be resold. For example, with respect to engine 120, core 128 may include the engine block, heads, crankshaft, camshaft and other parts (not shown) that either do not wear out or that can be reconditioned. The core may or may not include spent parts (that is, parts that would need to be replaced in a remanufacturing situation). Spent parts may include the pistons, cylinder liners and fuel injectors (not shown). The parts described here as spent or rebuildable are for illustration purposes only, as different parts might in different circumstances (such as with different manufacturers or in different products or embodiments) be treated differently. The value of a core, and thus the full economic advantage, lies in returning the core with maximum reusability. Whether or not the spent elements are returned as part of the core 128 is typically less important, as the manufacturer 122 will not use them in the remanufacturing process (but may gain from recycling the materials).

In the illustrated model 114, customer 124 returns core 128 to or through dealer 126 at step 130a. The dealer 126 will receive the core 128 and do an inspection of it at step 132. The dealer 126 will then return the core 128 at step 130b to the manufacturer 122. The manufacturer 122 receives the core 128 from dealer 126 and also does an inspection at step 134. The core 128 is then shipped to a facility at step 136 and rebuilt. The remanufactured product 138 (similar to engine 120) is then made available for sale such as through a repeat of step 118. Where the inspection at step 132 of the customer returned core 128 is acceptable, the dealer 126 will typically immediately issue an exchange credit 140 (that is, return the deposit in some fashion) to the customer 124 at step 142.

Return of a core for remanufacturing, as briefly discussed above, usually involves the core 128 in an inspection to determine the amount of credit available to the returning party (dealer or customer, as the case may be). However, in some embodiments or other businesses, the fact of return of a reusable or even spent item itself may be sufficient to justify return of a deposit. Two types of inspections will be referenced in the embodiments to be described. Different embodiments may have different types of inspections, a different number of inspections, or different acceptance criteria upon which inspections are based.

One type of inspection is the commercial inspection 144 (part of step 134). A commercial inspection is typically a visual inspection to assure that the correct core has been returned and that it appears intact. For example, in returning a core represented by a worn engine, the inspection might verify the serial number of the engine to assure that the core comes from the correct model engine. At the same time, the inspection would visually confirm, for example, that the engine block as part of the core 128 is not cracked or that rebuildable parts of the core are not missing. A crack would render the engine block unusable and thus render the core 128 substantially valueless for remanufacturing purposes. Missing parts also reduce the value of the core.

The other type of inspection to be discussed is a reuseability or remanufacturability inspection 146 (also part of step 134). This inspection is more thorough in that it determines the usability of a core for remanufacturing purposes. This often involves disassembly of the core 128, taking of an inventory of parts in the core and measurements of parts that add substantial value to remanufacture.

In the embodiments to be discussed, the commercial inspection 144 will be used to determine the exchange credit 148 for the dealer 126 (step 150). Likewise, it will be used by the dealer 126 for customer exchange credits 140. It will be seen that it is beneficial for the dealer 126 to follow the commercial inspection 144 practice of the manufacturer 122, so that the same inspection standards are used for core credits at all levels.

Typically, those making returns will have the opportunity to receive full, partial or no credit for core returns. Depending upon need, the partial amount available for a core, for example, can be any amount, select amounts or possibly just one amount selected between full and zero credit. Accepting many differing amounts for partial credit may complicate the process, so it is anticipated that partial credits will typically be limited to one or a few choices or standardized deductions will be used from full value. This will also fit the use of standard inspection criteria by enabling the assignment of specific, select amounts (or percentages of full value) based upon particular categories of, or the relative substance of, deficiencies in a core. Another embodiment may simply allow full or no credit, meaning that cores must fully satisfy manufacturer's (or dealer's) requirements or no credit at all will be given. Where the manufacturer 122 disagrees with the dealer's commercial inspection 144, the dealer 126 will typically receive exchange credit 148 based on the manufacturer's determination.

Figure 3:
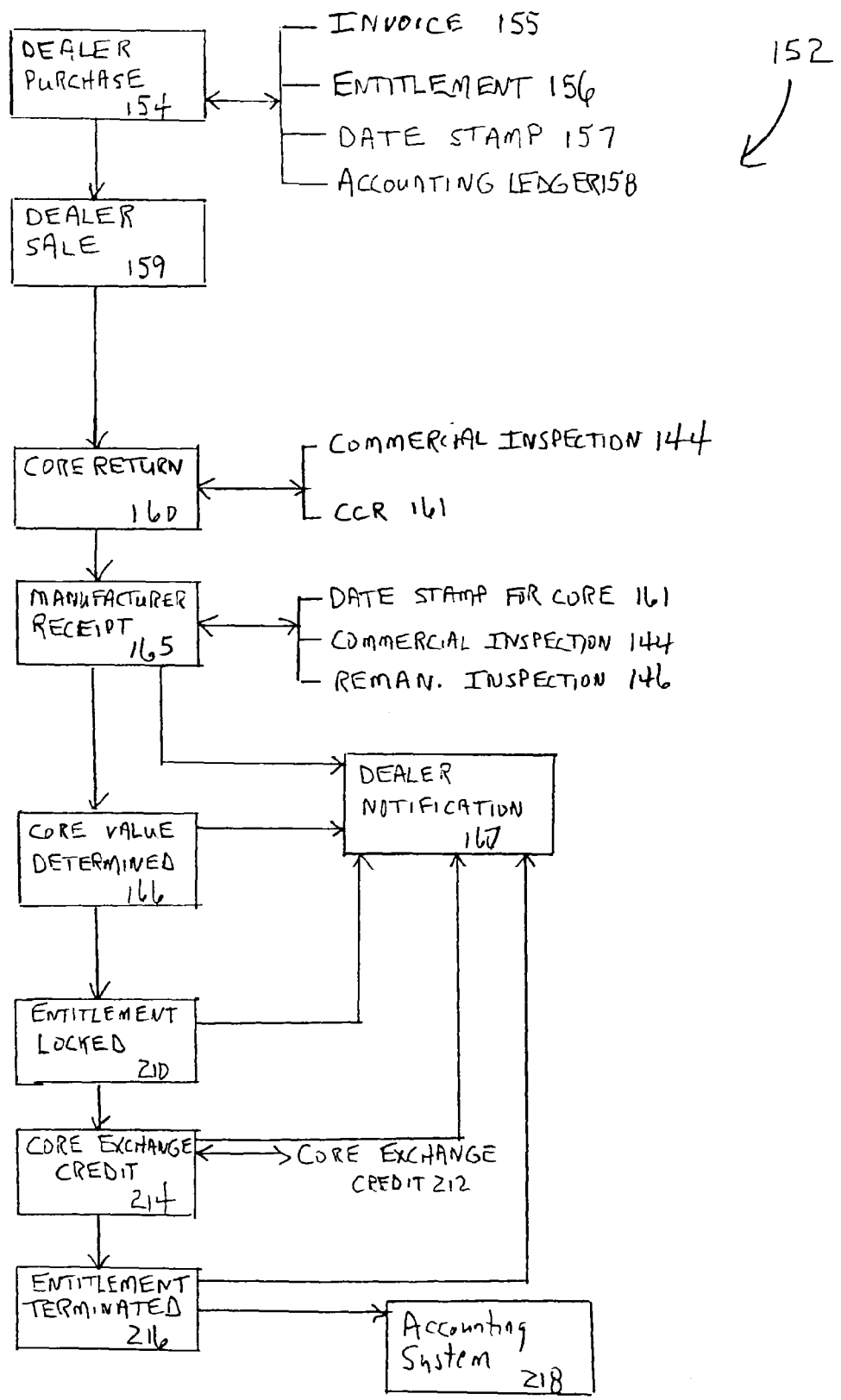
FIG. 3 illustrates a flow chart of an exemplary method for remanufacturing consistent with principles related to the present invention.

Prior to referring to embodiments represented by FIG. 3 and FIG. 4, a discussion of certain exemplary concepts will facilitate an understanding of those embodiments.

For every remanufactured part sold, the manufacturer 122 typically invoices the purchasing dealer 126 for the remanufactured part, which includes a deposit for the return 127 (such as the core price component). The manufacturer creates an "entitlement" for deposit and records a liability in the amount of the deposit. In some embodiments, both an entitlement and liability do not need to be created, but use of both will be seen as an effective way to manage systems or methods, particularly to facilitate core management separate from accounting functions. The dealer may return a core for exchange credit to offset against the liability. The dealer may or may not utilize the same methodology or systems with the customer as described herein between the manufacturer and dealer. For simplicity, the management of cores and liability between dealers and customers will not be discussed in any particular detail. Discussion with respect to the dealer-customer level will be limited primarily to support the description of the relationship involving the manufacturer 122 and dealer 126. Of course, the discussion with respect to a manufacturer-dealer relationship is relevant for other relationships.

Return of a remanufactured part against an entitlement or liability is also possible. This simply represents the ordinary situation where a dealer (or customer) does not need or desire to keep a part that has been purchased. However, if the dealer 126 has no available entitlement or liability, dealer 126 will only be credited with the part price component (the deposit will be forfeited to manufacturer 122).

In some embodiments, only a core that comes from a particular item can be returned for exchange credit. For example, a core having the same part number as the item sold that led to the entitlement. In the present example, cores will be accepted if they are in a "core acceptance family" or "CAF". A core acceptance family is defined to include cores of a like nature or quality. Using CAF's will be explained later. It should be understood that many different "rules" may be used for crediting returns.

Another concept to be utilized is that of attritioning. Attritioning is removing an entitlement or liability that does not have an associated core return within a defined time period. Thus, in embodiments using entitlements, an entitlement will have a finite life within which a core must be returned to be matched against that entitlement. If this does not occur, the entitlement, in effect, expires and the entity holding the core deposit (for example, manufacturer 122) will no longer have the liability represented by that deposit. In other words, the entity will keep the core deposit amount. Failure to return within a specific time may occur for a variety of reasons. A dealer may have an entitlement attritioned because of the customer's actions or its own failure to collect or ship cores in time. A customer may forget or fail to replace the newly purchased part for a period of time and thus not obtain a core for return in time.

The total attrition time, meaning the time an entitlement (or liability) remains available for credit, is as follows:

Total Attrition Time=Time Parameter+Value Parameter

The time parameter is simply the time period in which a core may be returned in exchange for up to the full core deposit. This will be the same amount as the entitlement created at the time of purchase. The value parameter is another time period subsequent to the time parameter. If a core is returned during the value parameter, less than the value of the core as determined can be credited. This will typically mean reducing inspected value by a percentage of the actual core value. In some cases, only the time parameter will be offered, and thus the value parameter is zero. In these cases, when the time parameter for a given entitlement is exceeded, the entitlement will be cancelled and cease being available for exchange credit upon return of a core. In cases with a value parameter, value attritioning will come into play only when the time parameter has been exceeded and the entitlement will be cancelled when the value parameter is exceeded. Parameters, whether of time or value, can be set for specific entitlements and lengths of time. For example, they can be set by entitlements for a dealer, customer, product or item type, marketing channel or promotion, or core acceptance family (to be explained). Lengths of time will be set according to need and reasonable times in which a core should be returned. With respect to remanufacturing, fairly lengthy periods (such as fifteen months) are appropriate.

Still another concept to be utilized will be that of processing the oldest outstanding entitlement (or liability) first. This is typically known as first in, first out. Such processing can occur irrespective of whether the core returned is associated with the purchase of a part that caused the creation of the entitlement. The oldest entitlement will be processed simply when a correct core is received or, in the case of a core acceptance family, a core of that core family.

Finally, it is necessary to track time associated with different events. This tracking will be accomplished by time or date stamping. For example, in order to determine the oldest entitlement for processing, the creation of the entitlement will be date stamped, typically by recording the day, month and year. As previously discussed, the entitlement is typically created upon invoicing by the manufacturer 122 of the dealer 126. Therefore, the entitlement for exemplary purposes will bear a date stamp on the day of the invoice. Similarly, other events may be date stamped as will be observed in future discussion. It should be understood that the time that is used for the date stamping may vary depending upon the needs for the particular system, method or step for which time stamping is done.

Now referring to FIGS. 3 and 4, an example of one embodiment 152 will show further details of core exchange and settlement between the dealer 126 and manufacturer 122. As mentioned, this exchange may also have taken place between dealer 126 and customer 128 or manufacturer 122 and customer 128. This embodiment will illustrate attritioning, as well as first in, first out concepts for terminating entitlements. FIG. 3 represents a flow diagram of the steps that take place between the dealer 126 and manufacturer 122. FIG. 4 represents how a log or spreadsheet 153 may appear with information involved in the steps of FIG. 3, as well as additional information that may be useful for the manufacturer 122 and dealer 126. The illustration of FIG. 4 is representative of how a computer implemented system might display information. To begin with, an overview of embodiment 152 will be discussed. Further detail will then explained for an understanding of how specific steps can be accomplished and what information can be displayed.

At step 154 in FIG. 3, dealer 126 purchases an item 116 from manufacturer 122 at the remanufactured purchase price. The item 116 will be assumed to be the previously illustrated engine 120, which is further assumed to be remanufactured. As previously discussed, this price includes a core price component. At the same time, manufacturer 122 issues an invoice 155 for the purchase price at step 154 to be paid by dealer 126. Manufacturer 122 also creates an entitlement 156 in the amount of the core price component and date stamps 157 the entitlement 156 as of the invoice or transaction date. This is one in response to the sale of item 116. These and other identifiers associated with an entitlement will be explained in more detail. The date will be assumed to be Jan. 2, 2002. The liability of the manufacturer 122 to dealer 126 created by receipt of the core price component is posted to an accounting ledger 158 (also to be discussed later).

The dealer 126 may stock the purchased engine 120 for sale or may order it from the manufacturer 122 based upon a purchase order by a customer. In any event, the dealer 126 ultimately sells the engine 120 at step 159 to a customer (such as previously illustrated customer 124). At some point the dealer 126 will have a core 128 to return from whatever source. At step 160, dealer 126 will return the core 128 to manufacturer 122. In this example, the dealer 126 will also have conducted a commercial inspection 144 prior to the return. The purpose of the commercial inspection 144 is to determine the acceptability of the core 128 to reimburse the party that returned the core to dealer 126 and to make a request to manufacturer 122 for credit. Usually the request will be in the same amount as the inspection value, but there may be other circumstances where adjustments are made in determining the credit amount to be requested. With the return of the core 128, dealer 122 will also submit a core credit request or CCR 161. The CCR 161 documents various aspects about the return, including the inspected value (including special charges to correct deficiencies or otherwise adjust value), part number, and condition (with reasons recorded for less than full credit requested).

Manufacturer 122 will receive the core 128 and date stamp 164 the core 128 as of its date of receipt, perform its own commercial inspection 144 and also do a remanufacturability inspection 146 (step 165). Through the commercial inspection 144 by manufacturer 122, the core value will be determined for exchange credit purposes with dealer 126 (step 166). Where a dealer has also inspected the core 120, manufacturer 122 will document any differences in commercial inspection results. Manufacturer 122 will have the dealer's commercial inspection value by dealer's submission of the CCR 161. The manufacturer's commercial inspection 144 will typically prevail over the dealer's. Once manufacturer 122 has inspected the core 128, an exchange credit will typically be released to dealer 126 (discussed below). In this and other examples illustrated, the number of exchange credits to which a party is eligible cannot exceed the number of items 116, such as remanufactured parts, purchased.

The present systems, methods and steps contemplate a process by which dealer 126 has access to this information, including an explanation of differences with the manufacturer's inspection 144 (step 167). This access by dealer 126 (such as to the spreadsheet of FIG. 4) can be by dealer system 104 over network 106. In other embodiments, there may be a resolution process or other types of communication between the dealer 126 and manufacturer 122 to expedite the exchange of cores for credit. There are also other points in the illustration where dealer 126 may be notified or can access information (generally referred to for convenience within step 167).

Referring in detail to FIG. 4, an exemplary list of entitlements is illustrated in certain of rows 168 (specifically row numbers 168-1, 2, 5, 6, 8-11, 15 and 16). These are found under the "Customer Activity Audit Trail" portion 170 of FIG. 4. Previously referenced entitlement 156 is represented by row 168-1. An exemplary list of core returns are represented by certain other of rows 168 (specifically row numbers 168-3, 4, 7, 12-14). The entitlements and core returns represent the activity in a period of time 174 between two dates shown 174a, 174b for the particular dealer 126. Dealer 126 is identified by a customer code and customer name 176a, 176b respectively. Additionally, the dealer 126 may have multiple locations or other business divisions that return cores 128. These locations can be tracked by different codes in column 178.

The activities listed under the Customer Activity Audit Trail 170 took place over the period of time 174. For example, each of rows 168 has associated information in certain columns. Those columns include: part number (column 180), core acceptance family or CAF (182), type of activity (184), amount associated with the activity (186), quantity (188), running historical balance of entitlements with the dealer 126 through the activity on that row (190), and transaction date (192). The transaction date represents the appropriate date stamp. Attrition dates are recorded in column 194. A document number for manufacturer tracking purposes (such as invoice number) is recorded in column 196. While not shown, a column for a dealer document number could also appear. This would allow the dealer 126 to track by its document number.

Column 188 reflects the number of transactions for a given row in FIG. 4. For example, with respect to row 168-2, two parts each having part number R367 were purchased as indicated by the quantity of two. This purchase (and, by reference, a status of "entitlement") is indicated in column 184 with the code "INV", meaning invoice. The purchase resulted in two entitlements identified with row 168-2. Each received a date stamp as of the date noted in column 192, as well as an attrition date in column 194. In the amount column 186, it will be seen that the total entitlement value is $3740.00. Each entitlement represented in row 168-2 thus has an individual value of one-half or $1870.00.

Column 168 further addresses core returns. For example, in row 168-3, it can be seen that a core credit request ("CCR" code, column 184) has been made by the dealer 126. And the request has been acted upon through issuance of a partial credit to dealer 126 in the amount of $1,096.97. Since this is the same part number returned as the ones for which the entitlements in row 168-2 were issued, it can be seen that the full value of available credit is $1870.00. Thus, the CCR of row 168-3 was processed by manufacturer 122 at only partial value. Additional information about columns will be discussed.

It should be noted that the entitlement 156 shown in FIG. 3 (row 168-1) associated with customer's purchase of the engine 120 is the earliest outstanding entitlement for the time period 174. This is indicated by its transaction date (Jan. 2, 2002) in column 192 and the fact that, in column 194, its attrition date (Apr. 13, 2003) has not been exceeded. The attrition date was also set at the time the entitlement of row 168-1 was created. However, this does not mean that entitlement 156 is the earliest available to dealer 126. Other available entitlements may precede the time period 174 selected in the search for data shown by FIG. 4. Whichever is the oldest outstanding entitlement, that entitlement will be processed first when the "next" core 128 is received.

Referring back to FIG. 3, at step 160 dealer 126 sent the core 128 back and made core credit request or CCR 161. Specifically, that CCR 161 will be assumed to appear in row 168-4. It is indicated by the status of "CCR" shown in column 184 of FIG. 4. Typically, CCR's will be logged daily as cores are returned to manufacturer 122. However, CCR's could be logged on any time schedule. Further, CCR's do not need to be used at all in some embodiments, but their use will facilitate management of entitlements. Core returns or CCR's do preferably need to be issued in some time order because date stamping is relevant to dealing with entitlements. In this example, the CCR 161 for row 186-4 has a date stamp of Jan. 7, 2002, shown in column 192.

With the receipt of CCR 161, the oldest outstanding entitlement will be "locked" by manufacturer 122 (step 210) to indicate a core is in process with respect to that entitlement 156. This means that the entitlement 156 is not available for use should another core be returned. As previously mentioned, the oldest outstanding entitlement is not necessarily shown on FIG. 4 because of the existence of prior transactions. Referring to FIG. 5, "Details for Selected Audit Trail Row" 206 illustrates which entitlement (referenced at row 208) was locked and then eventually cancelled in connection with the core of row 168-4. It will be seen that the "Details" 206 table of FIG. 5 shows the same columns as FIG. 4. In this case, the returned core of row 168-4 is shown on the second row (also referenced as 168-4) of the "Details" 206. While not shown in FIG. 4, indication of the locked status could be identified on the display 153, so that dealer 126 has such specific information. Dealer 126 may also receive an e-mail that will confirm receipt of the CCR 206 and thus receipt of the core 128 (related to step 165).

Upon commercial inspection 144, the manufacturer 122 will have concluded the value of the core 128 as earlier discussed (step 166) and accept the CCR 161 at the core value determined. This will typically be the point at which the entitlement 156 is cancelled. In other embodiments, the CCR could be accepted immediately or automatically, which may result in cancellation of the entitlement at the same time. As will be appreciated through later discussion, adjustment of the related liability must await valuation of the core for the embodiments illustrated. In other embodiments and businesses, simply the fact that a return has been made may be sufficient. For this example, it will be assumed that full, partial or zero value will be allowed for core exchange credit. Partial credit will be limited to a single dollar amount for simplicity.

Based upon determination of core value, a core exchange credit 212 will be given at step 214 to dealer 126. The amount of the credit is indicated in row 168-3, column 186 by a negative dollar amount. In other words, the core exchange credit indicates a payment out by manufacturer 122. The status of the entitlement 156 will then be changed from "locked" to "terminated" (Step 216). When the entitlement is terminated, it is no longer available. While the entitlement 156 has been terminated, any transfer of payment or actual credit given will depend upon the amount of the core exchange credit 212 that was determined. This means that with the return of a core 128 by dealer 126, an entitlement will ultimately be terminated irrespective of the value of the returned core (that is, whether it is full, partial or zero). A zero value core may not result in the termination of an entitlement at all in some embodiments.

It should be noted that some steps of FIG. 3 may be performed in parallel or different order other than shown. For example, the entitlement 156 may be locked prior to or parallel to step 166 or the accounting system 112 may be updated upon determination of the core exchange credit (step 214).

The accounting system 112 will be utilized to account for transactions between dealer 126 and manufacturer 122 (Step 218). Simplified ledgers of FIGS. 6A, 6B and 6C will be illustrative. Actual settlement between the parties in terms of a currency exchange might be per transaction or at set periods. Based upon the volume of transactions in many businesses, it is not expected that settlement would happen every day. A monthly financial settlement would, for example, be more appropriate. FIGS. 6A, 6B, and 6C each have three rows and five columns showing a simplified method of accounting for each transaction represented by an entitlement and a core return that are matched for settlement. Columns 220 and 222 identify the activity by number and name, respectively. The activity number (not shown) may be an invoice number, core credit request number or other identifier. The activity name, in this example, will be an entitlement or core return (core exchange credit) event. Column 224 represents how a dealer 126 may account for the transaction. Column 226 is the liability account of manufacturer 122. Column 227 represents the income account for manufacturer 122. It should be noted that Column 224 would not be kept by manufacturer 122 and thus not appear in its ledger. However, it will help illustrate the dealer's accounting for transactions. The same row numbers (228-230) will be used for each of FIGS. 6A, 6B and 6C, but with a suffix of the letter for the figure being referenced.

Referring to the first row 228A of FIG. 6A, the entitlement 156 being terminated (step 216 in FIG. 3) is identified in columns 220 and 222. It has a negative value of $1870.00 based upon its original core price component from column 186 in FIG. 4 (column 226). This represents a liability of manufacturer 122 to dealer 126. It can be seen in column 224 that dealer 126 has a comparable entry as an asset. If core 128 (row 229A) was determined in the commercial inspection 144 to have a full value, the core exchange credit 212 issued will be in the amount of the entitlement 168-1 against which it will be credited (column 226). This value is reflected as a positive amount. In FIG. 6A then, based upon a full value core, manufacturer 122 will reduce its liability to dealer 126 to zero (row 230A, column 226). Dealer 126 will also have a zero balance.

If core 128 was determined to have only partial value, the core exchange credit 212 issued will be less than the entitlement 168-1 against which it will be credited (FIG. 6B). Again, assume that the core price component was $1,870 for which entitlement 208 was established (column 224). Assume that a partial credit is given in the amount of $500. In FIG. 6B, then, manufacturer 122 will still enter $1870 in row 229B, column 226, based upon the fact that the entire entitlement 168-1 was cancelled. Manufacturer 122 will enter $1370 on row 229B in column 227 to indicate a profit (the negative number in the income account illustrates a profit). Correspondingly, dealer 126 books $500 on row 229B in column 224 and has a loss on the transaction of $1370 (row 230B).

In FIG. 6C, entitlement 168-1 is still entered in row 228C at its full value of 228C. If core 128 was determined to have zero value, core exchange credit 212 issued will be $0 on dealer's books (row 229B, column 224). On the manufacturer's books, manufacturer 122 will again enter the full amount of the entitlement 208 in row 229B, column 226. A profit of $1870 is shown in column 227 at row 229C for the transaction. In FIG. 6C, then, manufacturer 122 will reduce its liability to dealer 126 to zero (column 226) and keep the entire, original core deposit.

As was previously noted, the manufacturer 122 may find after its remanufacturability inspection 146 that a core 128 has less value than was given based upon the commercial inspection 144. In this case, manufacturer 122 has a loss. Typically, because the core 128 is put in inventory when it arrives at manufacturer 122, the inventory account will be written down. Thus, the loss will appear in the inventory books and not those illustrated by FIG. 6A, B or C. The difference between an entitlement amount and the offsetting core value (whether from the commercial 144 or remanufacturability 146 inspection) represents an inspection variance.

It will be appreciated that accounting system 112, and the ledger illustrated in FIGS. 6A, 6B, 6C, may be any system, method, or step useful for accounting purposes, including computerized ones. Such accounting methods, steps and systems are well known in the art, including being integrated with a method, step or system such as illustrated in the other figures, and will not be discussed in detail here.

Now referring to FIGS. 7 and 8, attritioning will be further explained with the illustrated embodiment. It will be appreciated that FIG. 7 is a spreadsheet of the same form to that of FIG. 4. Therefore, the explanation of FIG. 7 will be done with the same second and third digits of the reference numerals of FIG. 4, but with the first digit being a "7". For example, log or spreadsheet 153 of FIG. 4 correlates with spreadsheet 753 in FIG. 7. This will enable a ready comparison to FIG. 4. As well, the relationship with the flow chart of FIG. 3 will be better understood. The difference in the data illustrated in spreadsheets 153, 753 of FIGS. 4 and 7, respectively, is because of the different time period 174 or 774 for each.

In column 794, each outstanding entitlement (rows 768-1, -2, -5) has been given an attrition time stamp or date (all such dates together referred to as 797). The attrition dates in this case illustrate a situation where only a time parameter is used. Thus, it will be seen that entitlements 768-1, -2 have attrition dates 794 of Jul. 23, 2001. Further down (in rows 768-9, 768-10), those two entitlements (rows 768-1 and 768-2) have been attritioned (that is, cancelled and no longer available to dealer 122). This is indicated by the code "ATT" in column 784. Similar to the illustration of FIG. 5, an audit trail 706 is shown for the entitlement of row 768-1 (FIG. 8). It can be seen by this audit trail 706, that the entry correlated to the attritioning of that entitlement of row 768-1 is in row 768-9 (as evidenced through the identifiers of column 796).

Where value parameters are also used, an attrition date will include within its time period a length of time during which returned cores only are entitled to partial credit (irrespective of the fact a core may be entitled to full value through a commercial inspection). In the manner FIG. 4 or 7 are configured, the value and time parameters would not be known. Only the total attrition time period would be known. A spreadsheet 153 such as that shown on FIG. 4 could still be used. The dealer 126 would see in column 186 that a partial credit was issued. Of course, dealer 126 may or may not realize the partial credit resulted from a value attrition situation or a commercial inspection or both.

FIG. 9 shows a portion of the spreadsheet 153 of FIG. 4, modified to illustrate value attritioning. The explanation will also be done with the same second and third digits of comparable reference numerals in FIG. 4 (and FIG. 7), but with the first digit being a "9". Column 194, which showed the attrition date on FIG. 4, has been divided into two columns 994a and 994b in FIG. 9. Column 994a shows a time attrition date (indicating the end of the time parameter for which time based attrition applies) and column 994b shows a value attrition date (indicating the end of the value parameter for which value attritioning applies).

Column 186 from FIG. 4 has likewise been divided into two columns 986a and 986b. Column 986a shows the amount of a credit for a CCR based upon a commercial inspection 144. Column 986b shows the amount of a credit for a CCR after value attrition. For a returned core 128, therefore, a dollar value will appear in column 986a showing the value determined by the manufacturer's commercial inspection 144. If the returned core 128 is also subject to value attritioning, a dollar value will also appear in column 986b. Whether or not the value in column 986a represents full or partial credit, the dealer 126 will see a lower dollar value in column 986b to represent a reduction in credit for value attritioning. In FIG. 9, in column 986b, the CCR of row 168-3 shows a dollar value for inspection 144 of $1,097.97, just as it did in FIG. 4. However, as an example, it now shows a lesser value of $878.38 in column 986b. The dealer 126 can readily see that manufacturer 122 has processed this CCR subject to value attritioning. The difference between column 986a and 986b represents the amount withheld by manufacturer 122 for value attritioning (in this case, a 20% deduction). The amount appearing in column 984b will be used by manufacturer 122 for accounting purposes. Dealer 126 can further verify value attritioning applied by checking column 992 against the value attritioning date of the entitlement matched against that CCR. This would be done by referring to a "Details for Selected Audit Trail" that can be accessed to show the matched entitlement. A figure is not presented that shows this information, but FIG. 5 may be used as illustrative. In the present embodiment, using FIG. 5 for illustration, the "Attrition Date" column of FIG. 5 would also be split into two columns as it is in FIG. 9. The first column would have the time attrition date and the second would have the value attrition date. The dealer 126 would see that the transaction date (column 992) for the CCR of row 968-3 falls after the time attrition date, but before the value attrition date in such a modified FIG. 5 with the appropriate audit information appearing. As dealer 126 will have the rules that manufacturer 122 applies for value attritioning, dealer 128 will understand how the difference is calculated. In other embodiments, other dates or amounts might be shown in columns 986 and 994 of FIG. 9. For example, the actual amount of the deduction for value attritioning might be displayed in column 986b. In some embodiments, dealer 126 may be automatically informed of entitlements within a certain time period of when they will be attritioned. Otherwise, dealer 126 will have access in a data base to identify such entitlements.

While manufacturer 122 accounting records will usually not be available to dealer 126, dealer 126 will typically have access to the detailed transactional information kept by manufacturer 122 (such as spreadsheets 153, 753, 953). For example, a spreadsheet 153 such as shown in FIG. 4 can be prepared for any time period. Further, historical information (outside the selected time period 174) is available in the period summary 240 of spreadsheet 153. Under "Period Beginning Balance" 242, the dealer 126 knows the number of entitlements (at 242a) outstanding and available as of the beginning of the time period 174, as well as their available dollar value (at 242b). Next, moving left to right, certain information is shown for the time period 174 of the displayed in the Customer Activity Audit Trail 170. "Purchase Invoices" 244 indicates the number and dollar value of invoices issued to dealer 126 by manufacturer 122. "In Process" 246 shows the number of core credit requests or CCR's that have not yet been processed. "Credits" 248 shows the number of core credit requests that have been approved and their total value. "Inspection Variance" 250 is the number of core credit requests approved at values less than dealer's commercial inspection 144 indicated (as shown on dealer's CCR). This variance is a subset of Credits 248. "Claims/Neg" 252 represents an adjustment for discrepancies between the dealer 126 and manufacturer 122 in sales activity.

Continuing, the number of "Attritions" 254 is shown and their total value. "Surplus Returns" 256 represents the number and value of returned purchases. "Policy Adjustments" 258 indicates the number and value of adjustments made where a dealer 126 has successfully challenged a manufacturer's commercial valuation 144, or manufacturer 122 has forgiven an attrition by accepting a late core return or otherwise accepted a CCR out of the rules. Finally, "Period End Balance" 260 is the number of available entitlements at the end of the time period 174 shown. One can readily see that the sum of eight of the items 242-258 (excepting Inspection Variance 250), in terms of number of transactions or in dollar value, will equal the Period End Balance 260.

Figure 10:
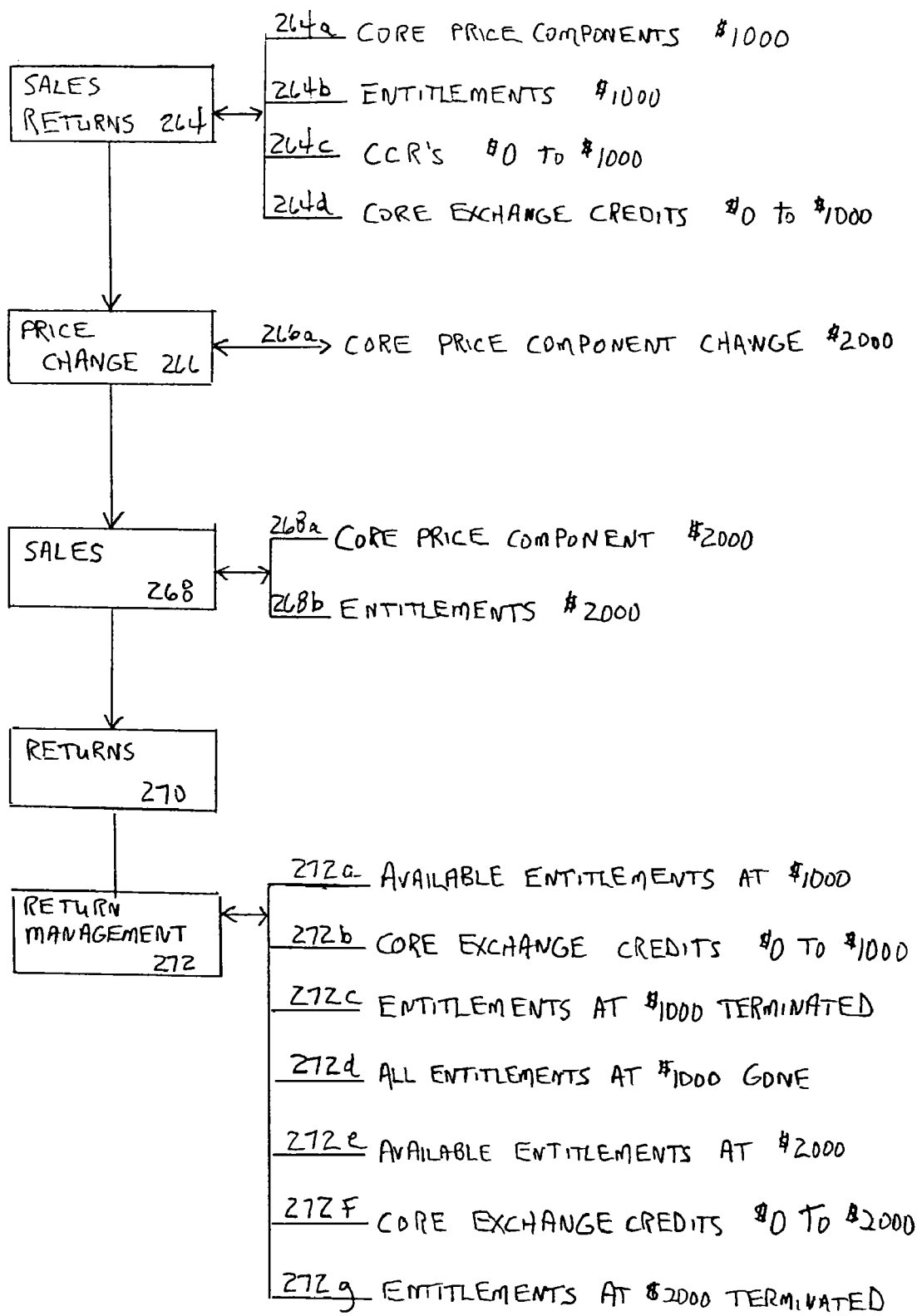
FIG. 10 illustrates an exemplary flow chart of still another embodiment of, and consistent with the principles related to, the present invention.

Price changes will now be discussed. FIG. 10 is a greatly simplified flow chart, illustrating an embodiment involving price changes. Insofar as the present discussion addresses some elements of prior examples, the same references and reference numerals for some elements will be used.

Step 264 illustrates the sale of remanufactured items 116 (engines 120) and the return of cores 128. As has been discussed, the sales involve the payment and collection of core price components (sub-step 264a). Entitlements (such as 156 in FIG. 3) are created in response to sales. CCR's 206 are issued. These occur at steps 264b and 264c, respectively. The first core price component of sub-step 264a is assumed to be $1000. Entitlements and liabilities will thus be created with a value of $1000 (264b) and CCR's will have a potential value of $0 to $1000 (264c). At step 264d, core exchange credits are given and entitlements cancelled.

Assuming that this activity of sales and returns has gone for some time, the manufacturer 122 may wish to change the first core price component from the value shown in step 246b. At step 266, a price change is established. A second core price component will now be set at $2000 (step 266a). Sales continue (step 268) with the second core component price of $2000 being charged (step 268a) and entitlements accordingly being established (step 268b) with a value of $2000.

While sales continue at step 268, return of cores 128 will also continue to occur (step 270). The cores 128 may come in any order. This means that cores returned may come at any time based upon sales of engines 120 for which the core price component was set at the new higher price of $2000 or at the old lower price of $1000.

At step 272, core return management over time occurs as illustrated. The first entitlements considered against returns are those that were set at the lower price of $1000, because in date stamp order such entitlements 170 will be the oldest ones outstanding (step 272a). As will be seen at step 272b, core exchange credits will be given against CCR's in the range of values between $0 and $1000. This range represents the full, partial or zero core exchange credit available as previously discussed. Thus, a core's full value will only be allowed up to the amount of the entitlement against which it is to be credited. This is the case whenever a core is returned and whether or not the core 128 itself came as a result of a later sold item 116 with the a higher core price component. Entitlements are terminated as a result at sub-step 272c.

At some point all entitlements 170 at the $1000 value will be either terminated (step 272d) or attritioned, if attritioning applies. Entitlements at $2000 will then be next available in their date stamp order (step 272e) and core exchange credits given from $0 to $2000 based upon CCR's (step 272f). With the acceptance of those CCR's, the entitlements at $2000 will be terminated (272g), unless they otherwise are attritioned.

An additional element of price change involves modifying the item price component (or return price component, as is used in the examples) of items over time. For example, the price change may be from a first amount to a second amount. If the item price component is changed it will typically have no effect on returns. However, it will affect the return of unsold items with respect to being able to determine the amount of the item price component to be returned or credited. This arises because the item being returned may have been purchased at the first item price component and first return price component. However, if purchased in the present, the item would have a value at the second item price component and second return price component. The systems, methods and steps illustrated will permit the returned item to be accepted with credit being given for its item price component at the second item price component. At the same time, the credit given for the return price component can be at the first return price component.

It will be appreciated that various systems, methods or steps discussed with respect to other embodiments may be useful with, or make use of, aspects of the embodiment illustrated by the flow chart of FIG. 10. For example, core acceptance families may be used, entitlements may be locked first and then terminated and inspections may be used.

Figure 11:
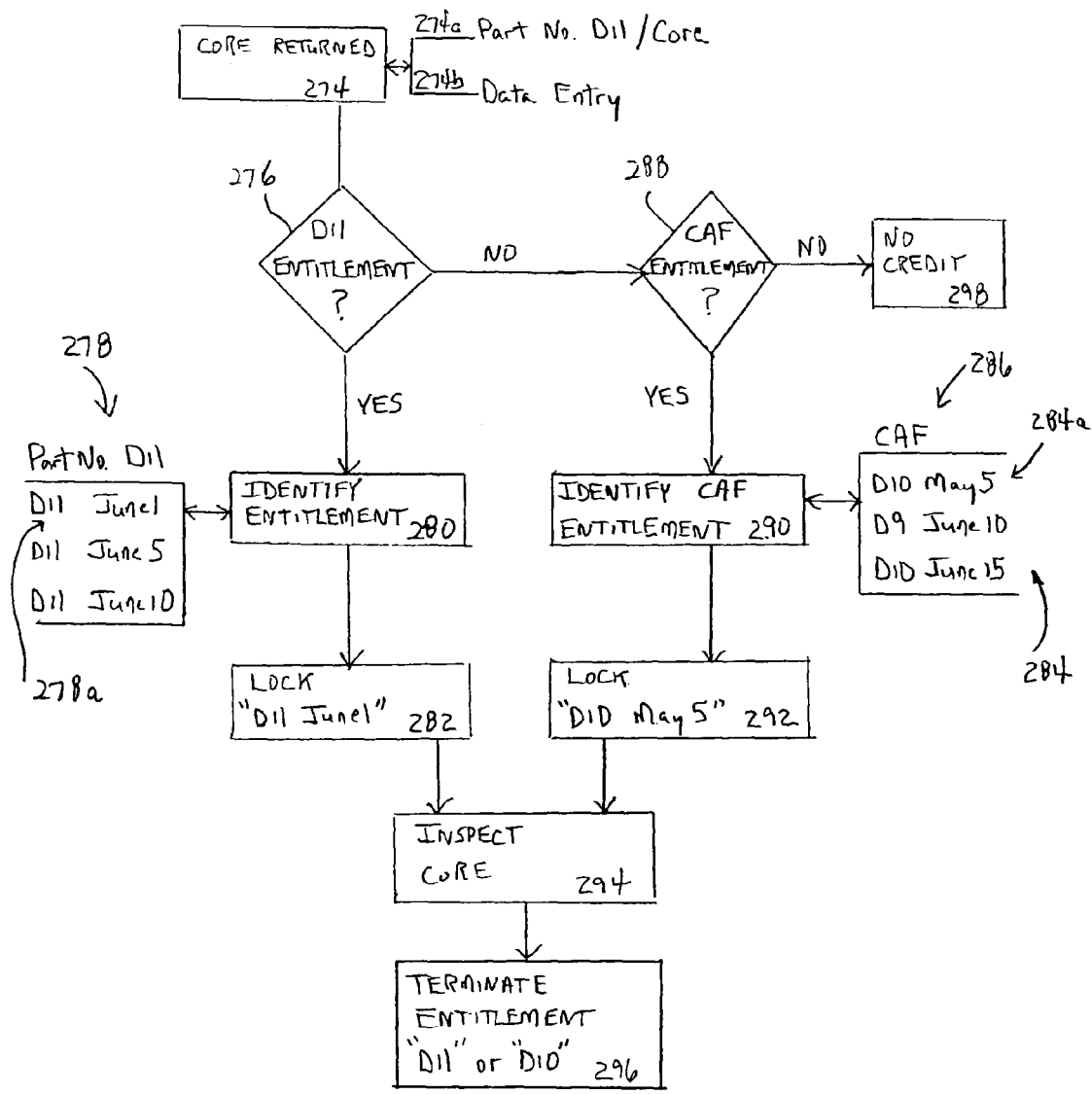
FIG. 11 illustrates an exemplary flow chart of yet another embodiment of, and consistent with the principles related to, the present invention.

The exemplary embodiment represented by the flow chart of FIG. 11 will further illustrate the use of core acceptance families. At step 274 a core is returned that has part number D11 (step 274a). The core will be referenced as core 128 previously discussed. The necessary information regarding the core 128 is also entered into the management system 110 at step 274 to track core 128 (step 274b). A search at step 276 is made first for entitlements 278 available that are of the same part number D11 as the returned core 128. If such an entitlement is available, then the earliest available such entitlement 278a will be identified (step 280). This entitlement 278a is selected and subsequently "locked" at step 282. It can be seen that there are two other entitlements 278b and 278c, but they have entitlement dates of June 5 and June 10, respectively. These dates are later than the date of June 1 of entitlement 278a. In other embodiments, a CAF may first be identified and then searched for entitlements with the same part number.

At step 276, if an entitlement 278 for the same part number is not found, a search is conducted for entitlements 284 with part numbers in the same CAF 286 (step 288). If an entitlement in the same CAF 286 is found, the earliest available such entitlement 284a will be identified (step 290). It will be seen in this case that entitlement 284a for part number D10 dated May 5, is selected from a list 284 of "other part numbers" entitlements, including part numbers D9 and D10, dated June 10 and June 15, respectively. Entitlement 284d will then be locked at step 292. It should be understood that part numbers D11 will be considered a part of the CAF 286, but for simplicity in illustrating core acceptance families, the CAF 286 is shown divided by D11 part numbers and the others.

Once an entitlement 278a or 284a is selected, the returned core 128 will be inspected at step 294. It will be appreciated that this inspection step 294 can be done prior to identifying an applicable entitlement 170 or in parallel. The appropriate entitlement 278a or 284a is terminated at step 296.

If no entitlement 278 or 284 is found, then no credit will be given for a return (step 298) and the core 128 is returned. This will be the case at least under the rules that apply for terminating entitlements as contemplated by this embodiment, although the manufacturer 122 may agree to accept the core 128 under an exception or other program.

It will be appreciated that various systems, methods or steps discussed with respect to other embodiments may be useful with, or make use of, aspects of the embodiment illustrated by the flow chart of FIG. 11.

Another possibility for manufacturer 122 to receive cores 128 will be referred to as core banking. Core banking permits dealers to bank core credits by returning excess cores to the manufacturer 122. Excess cores will typically be those which a dealer 128 has collected by various means that are in excess of qualified entitlements belonging to the dealer 128. The incentive for manufacturer 122 to accept such cores will be, for example, to receive cores that are in short supply. The manufacturer 122 will determine which specific cores will be allowed for return under core banking. The following embodiment is discussed with respect to banking core credits to be offset by purchases of items of the same part number for which the core credit was given. Core banking may also be practiced with core acceptance families.

Figure 12:
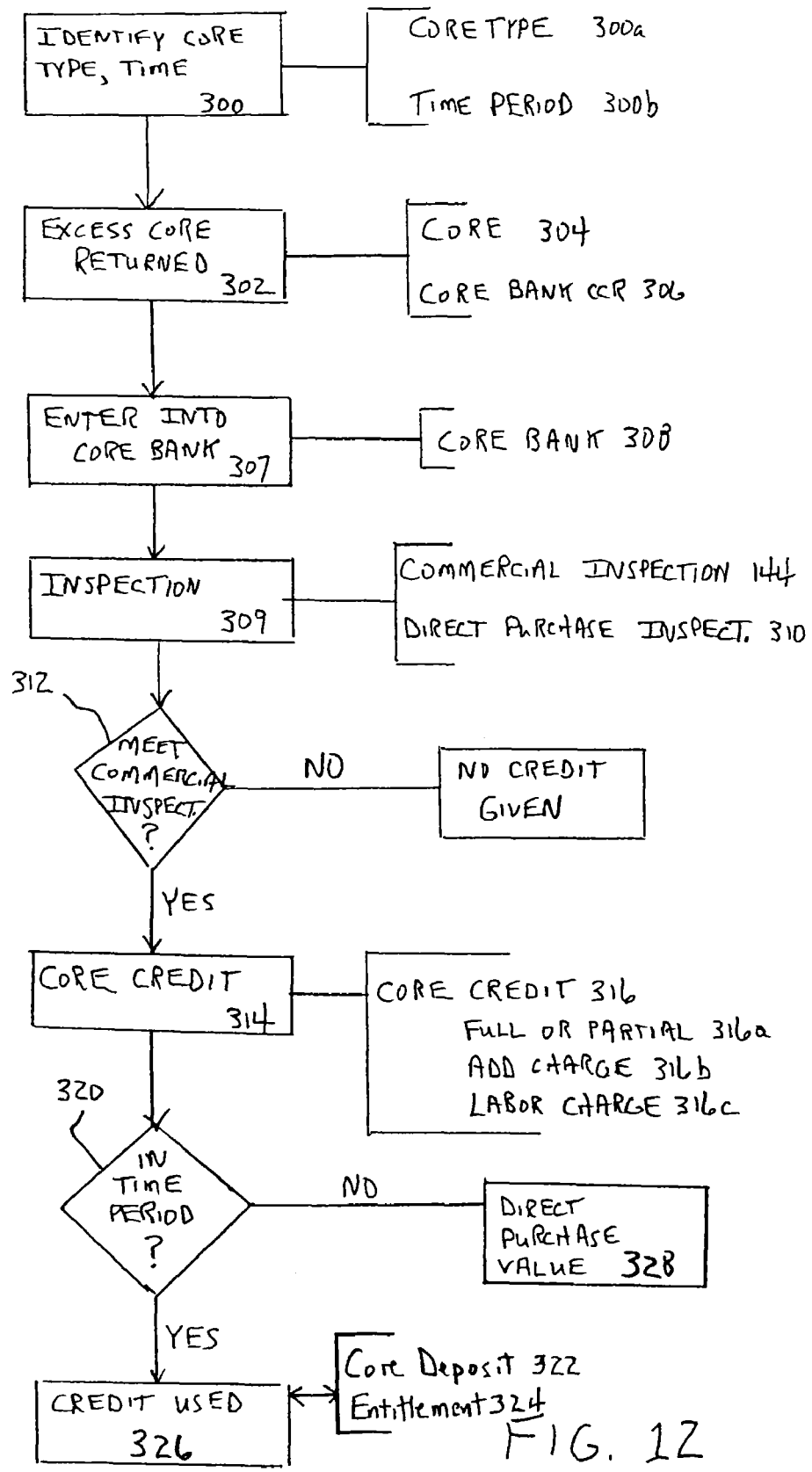
FIG. 12 illustrates an exemplary flow chart of yet still another embodiment of, and consistent with the principles related to, the present invention.

Referring to FIG. 12, an illustration for one embodiment of core banking is shown in the flowchart. At step 300, manufacturer 122 identifies a core type 300a it will receive for core banking and a time period 300b (beginning and end date) during which it will accept cores of that type. Dealer 126 at step 302 returns an excess core 304 of type 300a to manufacturer 122 within time frame 300b. The dealer 126 also makes a core bank core credit request 306 to manufacturer 122. The core 304 (and core bank CCR 306) is entered into the core bank 308 (step 307). Eventually the core will be put into inventory. The core bank 308 information is preferably maintained in a manner similar to the spreadsheet 153 of FIG. 4 and accessible to dealer 126.

Inspection is performed at step 309 by manufacturer 122. This inspection includes both a commercial inspection 144 and a direct purchase inspection 310. For the purpose of this example, it will be assumed that the direct purchase inspection 310 will be the same as the remanufacturability inspection 146. It should be understood that only one type of inspection (such as 144 or 310) could be used, but the reason for doing both will become apparent. Clearly, any type of inspection appropriate for evaluating cores could be used. In this case, however, the commercial inspection and/or reusability inspection common with the exchange model 114 is used because core banking can be utilized within the same methods, systems and steps previously discussed with respect to core returns against entitlements.

At step 312, it will be determined whether the core has value pursuant to the commercial inspection 144. If it does, a core credit will then be available to dealer 122 in the core bank CCR 306 (step 314). Core credit is issued on a first in, first out basis, one returned core at a time. The core credit is shown as reference number 316. A returned core will actually have two available credit amounts, one at the commercial inspection 144 value and the other at the direct inspection 310 value. Core credits may be either for full or partial credit (316a). There may also be an "add" charge (316b) and/or a labor charge (316c) to add missing parts, correct damage, or, if an older core has been accepted for a newer version, to upgrade the core. It will be appreciated that these charges may further apply to the other embodiments. A returned core 128 is thus tracked with respect to both its commercial 144 and direct inspection 310 results. However, if the core 304 fails the commercial inspection 144 by having no value, no core bank credit will be available (step 318).

If dealer 126 purchases a remanufactured item (step 320) within the program time period 300b, the purchase is handled similarly to previously discussed embodiments. That is, dealer 126 is invoiced a core deposit (core price component) 322 and the part price (part price component) and receives an entitlement 324. If a like item is also in the core bank 308, the dealer's entitlement 324 will be terminated at step 326 in favor of the earliest available core credit (first in, first out). In effect, the amount of the entitlement (core deposit amount) for the purchase will be made equal to the amount of the first available core credit for same item. The dealer 122 will typically receive a credit memo that reflects this activity. Core acceptance families may also apply in other embodiments. In that event, if dealer 126 purchases a part in the same core acceptance family within the program time period, the entitlement associated with that purchase can be used.

If dealer 126 does not purchase a remanufactured part during the program time period 300b, dealer 126 will receive a core credit based upon the results of the direct purchase inspection 310 (step 328). This credit from inspection 310 can be paid to dealer 126 after the end of the program or otherwise applied between dealer 122 and manufacturer 126. As will be appreciated, the credit from the direct inspection 310 may be less than the commercial inspection. It will be appreciated that various systems, methods or steps discussed with respect to other embodiments may be used in connection with aspects of the embodiment illustrated by FIG. 12.

One skilled in the art will realize that the configuration of any one of the systems, methods and steps as shown are exemplary and not intended to be limiting. A number of different processes and configurations may be added and/or removed without departing from the scope of the present invention. As will be appreciated, many of the aspects of the systems, methods and steps consistent with principles of the present invention can be automated. One skilled in the art will be able to provide the capability of computer implementation through software programs.

INDUSTRIAL APPLICABILITY

For situations that depend upon the return of items 116, the disclosed systems, methods and steps provide for tracking data and financial results, plus a ready way to communicate information. The data and financial returns may be tracked manually or through computer implementation. Systems, methods or steps that are integrated offer additional advantage.

The illustrations, while directed toward a remanufacturing business, should not be so limited. Other types of situations can take advantage of the disclosed systems, methods and steps. Many different parties, including all types of manufacturers, distributors, dealers or other entities may accept returns and act upon them. For example, a distributor may refill returned containers under license of another party. A recycler may accept returns for salvage or disposal, but need to track returns.

It will be appreciated that having multiple purchasers that make returns 127, or multiple dealers 126 that have multiple customers 124, will provide a level of complexity with respect to any system, method or step. Complexity stems from different relationships of parties involved, the volume of sales and subsequent returns in random order, the handling of many returns, the ability to track the data, and the need to properly account for liabilities for deposits on the returns. Liabilities themselves can accrue in high dollar amounts based upon business volume. Returns are not always made at all. It is not uncommon for many returns to be made long after the purchase of the item 116 that generates the deposit. This may be the case for a dealer 126 because the dealer will stock parts for later sale. In a customer's case, the core may not be available for return until the replacement item is installed. Thus, management of liabilities that may be outstanding for lengthy periods can become complicated. The longer these circumstances persist the less accuracy and control any system or method will have. Additionally, if a party depends upon returns or is perhaps required to accept them, accurate records need to be kept. For a party such as manufacturer 122, this facilitates scheduling of rebuilding of returns 127 with knowledge of inventory or to running of programs to encourage more returns 127. It will also assist with financial, or tax or other governmental requirements, including the purpose where there may be a need to show that specific returns were made.

With an understanding of some of the situations involving returns 127, a review of the exemplary systems, methods and steps disclosed will illustrate their roles. The exchange model 114 of FIG. 2 illustrates a basic remanufacturing business that depends upon the return of cores 128. By the nature of the business, cores 128 have significant value. The manufacturer 122 depends upon them to rebuild more remanufactured items and continue its business. The cores returned are preferably from items replaced by the remanufactured items sold by manufacturer 122. This supports the remanufacturing business. The cores can come from any source, of course, as they can be difficult to precisely track, especially in large businesses. The number of exchange credits a dealer is eligible for (that is, the number of cores returnable) should not be more than the items the dealer has purchased (as will also be true for a customer). Otherwise credits may be built against the dealer or manufacturer without building the dealer's or manufacturer's business through purchases.

FIG. 3 illustrates steps that facilitate tracking capability and management of returns 127. In particular, entitlements are created in the remanufacturing system to assist with tracking deposits and returns. A liability account could be used without correlating entitlement records (in other words, the liability account will take the place of the entitlement). However, it is very convenient to record deposits and returns in the management system 110 by use of entitlements and to maintain liability accounting records in an accounting system (such as 112).

Dealer 126 and manufacturer 122 inspections are also illustrated. While not all businesses may require inspections or inspections to any significant degree, businesses such as remanufacturing depend on the real value (in this case, the reusability) of the core 128. The dealer 126 and manufacturer 122 use commercial inspections 144, in this example, for providing exchange credits to both the customer 124 and dealer 126, respectively.

The reason for relying on the commercial inspection 144 for assessing core credit is to expedite core credit exchanges for both the customer 124 and dealer 126. It will be seen that it is beneficial for the dealer 126 to follow the commercial inspection 144 practice of the manufacturer 122, so that the same inspection standards are used for core credits at all levels. Commercial inspections are often visual and done according to standard inspection criteria, making them readily understandable to the parties involved. The remanufacturability inspection 146 is conducted to determine, first of all, whether the core 128 is acceptable for remanufacture. The manufacturer 122 will also determine the requirements for remanufacturing the particular core, so that scheduling the remanufacturing process is enhanced.

As will be appreciated, manufacturer 122 takes a risk conducting the more substantive reusability inspection 146 when credits are issued based upon the commercial inspection 144. The inspection 146 may reveal that the core 128 has no substantive value for remanufacturing into an item for sale or that it has less than the value determined by the commercial inspection. The dealer 126 also takes a risk that its commercial inspection (step 132) will not be verified and agreed to by manufacturer 122.

FIGS. 3 and 4 also illustrate time stamping at step 165 and column 192, respectively. Time stamping provides flexibility within the systems, methods and steps illustrated. By using entitlements 156, and associating the entitlements 156 and returns 127 with dates, various advantages are provided through tracking at the level of individual purchases and returns (steps 154 and 160, respectively, in FIG. 3). It will be appreciated that different situations may provide the need to apply dates to the returns or purchases based upon different rules for when time stamping occurs.

The systems, methods and steps are data driven to manage at the individual entitlement 156 and core return (step 160 of FIG. 3) levels. FIG. 4 is illustrative of the type of spreadsheet 153 that can be used. While it can be customized to reflect business needs, the spreadsheet 153 illustrates how tracking can be done. FIGS. 5 and 8 illustrate audit tracking that can be done when it is desired to know how individual items are dealt with. For example, one can immediately track how an entitlement 156 was handled with respect to a core 128 return. This information then becomes available to dealer 126 (for example, step 167 in FIG. 3). It is especially useful when integrated or connected with credit memo, accounting, and inventory systems.

For example, in some embodiments, a dealer 126 may be issued a credit memo with each transaction. Thus the dealer 126 will know that an entitlement 156 has been issued or a core return processed with a certain value. Where the dealer 126 wishes to track this information in its own system, the credit memo can be used for such purposes and to provide an audit trail.

Tracking at the individual transaction level, plus providing a first in, first out approach to dealing with entitlements and the ability to attrition, provides a significant amount of capability in the systems, processes and methods illustrated. Price changes and liability management illustrate some of this capability. Core acceptance families and locking entitlements pending action on them are other important capability.

For example, price changes may be made without losing control of liabilities. Management of returns 127 is generally not sensitive to changes in the item price component. This is because the item price component is not tracked for liability purposes. As such, it can be changed at any time. The return price component, on the other hand, has a direct affect on liability. A difficulty arises in changing the return price component prospectively. It is desirable to do so from time to time, particularly to raise the core price component to effectuate the return of cores or adjust to changing market conditions. It is not necessarily expected, however, that price changes will be done frequently and in small amounts. Infrequent, step changes are more typical, especially in the remanufacturing business. Changing core price components, however, results in the possibility of core exchange credits 212 for different amounts being handled at the same time.

It will be appreciated that with effective tracking, as well as first in, first out treatment of entitlements or liabilities, price changes can be satisfactorily managed and core returns given appropriate credit.

Core acceptance families provide additional capability in obtaining cores for those who need them and in returning cores by those who pay deposits. As earlier described, a core acceptance family typically includes cores of like nature or qualities. Thus, a core acceptance family is a grouping with interchangeable entitlements. For example, a core acceptance family may be defined to include the different generations or iterations of an item. This might be a group of different model changes. Frequently, a core acceptance family includes only those like cores that can be rebuilt into the latest generation of product. For example, any water pump core, returnable as a member of a water pump core acceptance family, would be capable of being rebuilt into the latest version of the water pump represented by that core acceptance family. It is typical to keep the different cores of a core acceptance family at the same or close to the same price.

In the illustration of FIG. 11, a core return is first matched against an outstanding entitlement of the same part number. If such an entitlement is not found, then entitlements within the core acceptance family are searched. The manufacturer could in some embodiments identify the oldest outstanding entitlement by considering the entire core acceptance family when receiving a core. However, one reason for not doing so may be the case where different core deposits in the CAF 276 have different values. For example, the part number D11 may have a core value of $500 in the embodiment of FIG. 11. One or both of the other part numbers in the CAF may have a different value, such as $510. The difference in core deposit price may reflect the additional cost to remanufacture one core into the latest version of the parts that comprise the CAF 276. Matching the core with a value of $500 against an entitlement at $510 will give the dealer 126 a loss of $10 and the manufacturer 122 a gain of $10. Actual value determined value for the core may further provide profit or loss as well.

These capabilities greatly expand the use of return based transactions. In the case of remanufacturing, customers obtain up to date parts while being able to return cores of older version parts. The manufacturer can work with cores of different prices, even by "mixing" returns in using core acceptance families. Yet, the transactions will still be economically attractive for the business and the customers. And liabilities can be controlled through attritioning those that are outstanding too long.

For a manufacturer 122 or other party, the spreadsheets illustrated 153, 753, 953 are representative of a database where information can be entered and is readily available at an individual transaction level. It may be the case that the accounting or inventory control systems will be separate, but the databases for each can still communicate with one another. They may do so automatically in some embodiments, such as by entering a liability when an entitlement is created. Thus, manufacturer will have the ability to move the information to its general ledger and maintain an accurate record of its liabilities and income (represented by FIGS. 6A, 6B, 6C). Manufacturer can also issue credit memos automatically from information contained in the database, as well as update its inventory control system. Updating an inventory control system permits a remanufacturer, for example, to schedule its plant operations, order parts that may be missing from cores 128, or understand the impact of its policy actions. The latter, for example, refers to situations where a manufacturer may accept core returns past attrition dates or accept a higher value for a core then perhaps is justified. The manufacturer 122 may also monitor its dealers 126 to help them control their core return activities.

Another important element is the ability to encourage core returns when core inventory is not sufficient. Core banking, illustrated by FIG. 12, is one of the programs that may be offered to increase its supply of cores 128. It may also be used to obtain cores where, for example, the manufacturer 122 wishes to begin the remanufacture of items it has not before offered. In the illustrated embodiment, it is time limited to encourage timely return of cores and further purchases of remanufactured items. While illustrated as kept through a separated system, core banking could be combined with the exemplary systems, methods and steps illustrated in other embodiments.

The systems, methods and steps illustrated, thus provide an effective manner to manage the use of returns. Depending upon the embodiment, several principles work together to enable effective tracking, and particularly management of liabilities. The invention is not limited to the above described aspects of the invention, but instead is defined by the appended claims in light of their full scope of equivalents.

What is claimed is:

1. A method for remanufacturing cores into remanufactured items, comprising the steps of:
   providing a total price for the remanufactured items, the total price including at least a refundable core deposit and a remanufactured item price, the core deposit being paid with the total price to secure return of cores for remanufacture;
   having a plurality of remanufacturer liabilities associated with different deposits paid to secure return of cores at the time of sale of remanufactured items;
   storing, in a memory device, data reflecting an earlier core liability and a later core liability, the earlier core liability corresponding to a core deposit paid upon sale of earlier-sold one of the remanufactured items, the later core liability corresponding to a core deposit paid upon sale of a later-sold one of the remanufactured items;
   receiving a core associated with the sale of the later-sold remanufactured item;
   inspecting the core associated with the sale of the later-sold remanufactured item;
   determining an amount of credit available for returning the core associated with the sale of the later-sold remanufactured item, the amount being based upon the inspection;
   updating the data stored on the memory device by applying the credit for the core associated with the sale of the later-sold remanufactured item against the earlier core liability, irrespective of the core deposit for the later-sold remanufactured item having been paid after the sale of the earlier-sold remanufactured item;
   establishing an entitlement in the amount of each deposit paid to secure return of a core and having a date identifier; and
   canceling the entitlement after return of core where the entitlement is the oldest available entitlement associated with the returned core;
   where the step of selecting the liability is based upon an association of the liability and the entitlement.

2. The method of claim 1, wherein the step of determining the amount of core credit is from a choice of one of full credit equal to the core deposit paid upon sale of the later-sold remanufactured item partial credit less than the core deposit paid upon sale of the later-sold remanufactured item, and zero credit.

3. The method of claim 1, further comprising: establishing a core liability and a corresponding attrition date for a sale of a selected one of the remanufactured items, the attrition date being after a date on which the selected remanufactured item is sold; and
   eliminating the core liability for the selected remanufactured item on the attrition date when a core has not been returned for the selected remanufactured item by the attrition date.

4. The method of claim 3, further comprising: establishing a partial credit date associated with the sale of the selected remanufactured item, the partial credit date being after the date on which the selected remanufactured item is sold and before the attrition date; and
   limiting the core liability for the selected remanufactured item to a value less than the corresponding core deposit if the core is returned on or after the partial credit date and before the attrition date.

5. A computer-readable memory device comprising instructions for causing a computer to implement steps in a method for remanufacturing cores into remanufactured items, the method comprising:
   storing data reflecting an earlier core liability and a later core liability, the earlier core liability corresponding to a core deposit paid upon sale of an earlier-sold one of the remanufactured items, the later core liability corresponding to a core deposit paid upon sale of a later-sold one of the remanufactured items;
   receiving an indication that a core associated with the sale of the later-sold remanufactured item has been received;
   updating the data by applying the credit for the core associated with the sale of the later-sold remanufactured item against the earlier core liability, irrespective of the core deposit for the later-sold remanufactured item having been paid after the sale of the earlier-sold remanufactured item,
   wherein the core deposit for the earlier-sold remanufactured item and the core deposit for the later-sold remanufactured item are a refundable part of a total price for the remanufactured items paid to secure return of cores for remanufacture;
   storing data reflecting an earlier entitlement corresponding to the earlier core liability having an amount equal to the core deposit paid with the total price of the earlier-sold core; and
   canceling the earlier entitlement after return of the core associated with the later-sold remanufactured item.

6. The computer-readable memory device of claim 5, wherein the applied core credit is one of full credit equal to the core deposit paid upon sale of the later-sold remanufactured item, partial credit less than the core deposit paid upon sale of the later-sold remanufactured item, and zero credit.

7. The computer-readable memory device of claim 5, the method further comprising:
establishing a core liability and a corresponding attrition date for a sale of a selected one of the remanufactured items, the attrition date being after a date on which the selected remanufactured item is sold; and
eliminating the core liability for the selected remanufactured item on the attrition date when an indication is received that core has not been returned for the selected remanufactured item by the attrition date.

8. The computer-readable memory device of claim 7, the method further comprising:
establishing a partial credit date associated with the sale of the selected remanufactured item, the partial credit date being after the date on which the selected remanufactured item is sold and before the attrition date; and
limiting the core liability for the selected remanufactured item to a value less than the corresponding core deposit if the core is returned on or after the partial credit date and before the attrition date.

9. A computer configured to implement steps in a method for remanufacturing cores into remanufactured items, the computer comprising:
means for storing data reflecting an earlier core liability and a later core liability, the earlier core liability corresponding to a core deposit paid upon sale of an earlier-sold one of the remanufactured items, the later core liability corresponding to a core deposit paid upon sale of a later-sold one of the remanufactured items;
means for receiving an indication that a core associated with the sale of the later sold remanufactured item has been received; and
means for updating the data by applying the credit for the core associated with the sale of the later-sold remanufactured item against the earlier core liability, irrespective of the core deposit for the later-sold remanufactured item having been paid after the sale of the earlier-sold remanufactured item; and
a processor for implementing at least the means for updating the data,
wherein the core deposit for the earlier-sold remanufactured item and the core deposit for the later-sold remanufactured item are a refundable part of a total price for the remanufactured items paid to secure return of cores for remanufacture.

10. The computer of claim 9, wherein the applied core credit is one of full credit equal to the core deposit paid upon sale of the later-sold remanufactured item, partial credit less than the core deposit paid upon sale of the later-sold remanufactured item, and zero credit.

11. The computer of claim 9, further comprising:
means for storing data reflecting an earlier entitlement corresponding to the earlier core liability having an amount equal to the core deposit paid with the total price of the earlier-sold core; and
means for canceling the earlier entitlement after return of the core associated with the later-sold remanufactured item.

12. The computer of claim 9, further comprising:
means for establishing a core liability and a corresponding attrition date for a sale of a selected one of the remanufactured items, the attrition date being after a date on which the selected remanufactured item is sold; and
means for eliminating the core liability for the selected remanufactured item on the attrition date when an indication is received that core has not been returned for the selected remanufactured item by the attrition date.

13. The computer of claim 12, further comprising:
means for establishing a partial credit date associated with the sale of the selected remanufactured item, the partial credit date being after the date on which the selected remanufactured item is sold and before the attrition date; and
means for limiting the core liability for the selected remanufactured item to a value less than the corresponding core deposit if the core is returned on or after the partial credit date and before the attrition date.

* * * * *